United States Patent [19]

Sato

[11] Patent Number: 5,191,476
[45] Date of Patent: Mar. 2, 1993

[54] GREAT RELATIVE APERTURE ZOOM LENS

[75] Inventor: Haruo Sato, Kawasaki, Japan

[73] Assignee: Nikon Corporation, Tokyo, Japan

[21] Appl. No.: 801,487

[22] Filed: Dec. 2, 1991

[30] Foreign Application Priority Data

Dec. 3, 1990 [JP] Japan ................................. 2-400203
Dec. 3, 1990 [JP] Japan ................................. 2-400244

[51] Int. Cl.$^5$ .............................................. G02B 15/14
[52] U.S. Cl. ...................................... 359/687; 359/676
[58] Field of Search ............... 359/676, 680, 683, 684, 359/687

[56] References Cited

U.S. PATENT DOCUMENTS

| Re. 32,923 | 5/1989 | Kreitzer | 359/676 |
|---|---|---|---|
| 3,584,935 | 6/1971 | Kojima | 359/687 |
| 3,972,591 | 8/1976 | Suwa | 359/687 |
| 4,105,291 | 8/1978 | Tsuji | 359/687 |
| 4,256,381 | 3/1981 | Kreitzer | 359/676 |
| 4,299,454 | 11/1981 | Betensky | 359/683 |
| 4,494,828 | 1/1985 | Masumoto et al. | 359/683 |
| 4,639,096 | 1/1987 | Kitagishi et al. | 359/687 |
| 4,641,928 | 2/1987 | Hamanishi | 359/687 |
| 4,657,351 | 4/1987 | Mani | 359/687 |
| 4,756,608 | 7/1988 | Itoh | 359/687 |
| 5,128,805 | 7/1992 | Kobayashi | 359/687 |

FOREIGN PATENT DOCUMENTS

| 46-43019 | 6/1971 | Japan | 359/687 |
|---|---|---|---|
| 55-62419 | 5/1980 | Japan | 359/683 |
| 56-114920 | 9/1981 | Japan | 359/676 |
| 57-168209 | 10/1982 | Japan | 359/683 |
| 59-57214 | 9/1984 | Japan . | |

*Primary Examiner*—Bruce Y. Arnold
*Assistant Examiner*—James Phan
*Attorney, Agent, or Firm*—Shapiro and Shapiro

[57] ABSTRACT

A great relative aperture zoom lens includes, in succession from the object side, a first lens unit having positive refractive power, a second lens unit having negative refractive power, a third lens unit having positive refractive power, and a fourth lens unit having positive refractive power. The first lens unit, the third lens unit and the fourth lens unit are designed to be moved toward the object side and displaced relative to the second lens unit during magnification change from the wide angle end to the telephoto end. The second lens unit comprises a forward unit having negative refractive power and positioned on the object side, and a rearward unit having positive refractive power and positioned on the image side, and is designed to satisfy the following condition:

$$-3 \leq f_{G2} \cdot h_{G2R}/f_T \leq -1.76$$

where
$f_{G2}$: the focal length of the second lens unit;
$h_{G2r}$: the height of the ray from the on-axis infinity object point from the position at which the ray has passed the outermost marginal edge of that surface of the second lens unit which is most adjacent to the image side at the telephoto end to the optical axis;
$f_T$: the focal length of the entire system at the telephoto end.

27 Claims, 7 Drawing Sheets

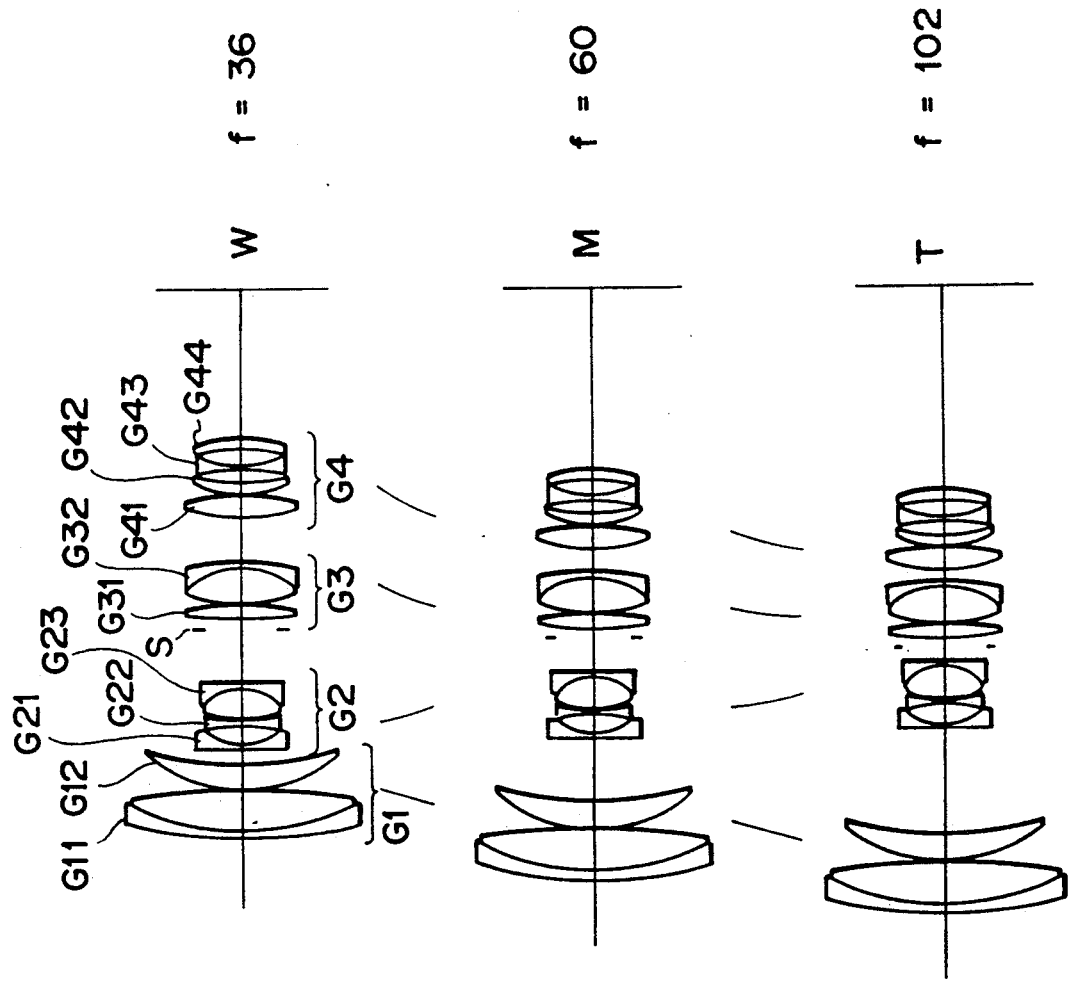

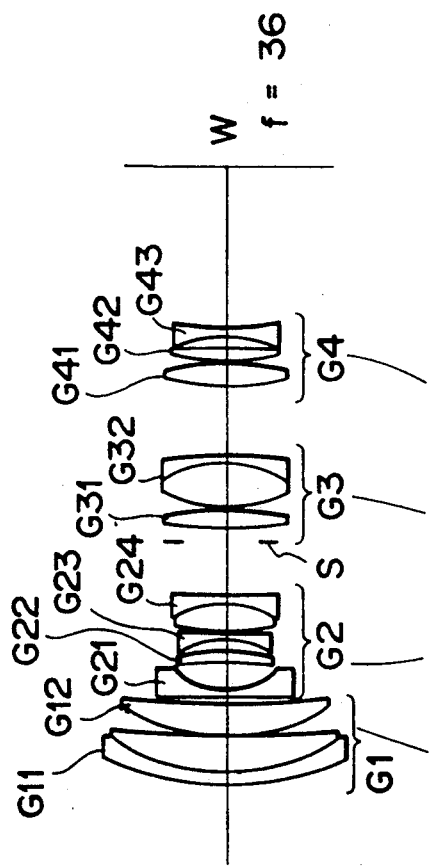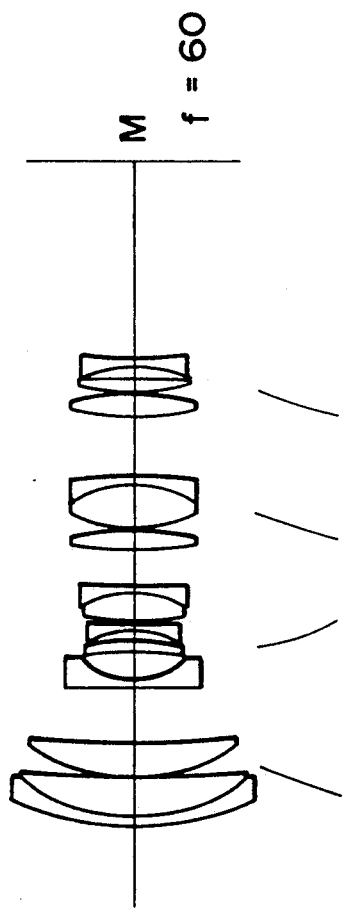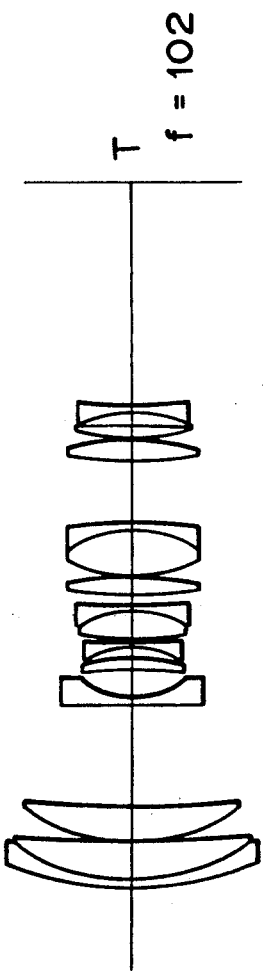
FIG. 7A  W  f = 36
FIG. 7B  M  f = 60
FIG. 7C  T  f = 102

GREAT RELATIVE APERTURE ZOOM LENS

BACKGROUND OF THE INVENTION

Field of the Invention

This invention relates to a zoom lens, and particularly to a great relative aperture zoom lens having a bright great relative aperture of the order of F2.8 and including a wide angle of view exceeding a maximum of 60° and having a relatively wide range of magnification change area from the so-called wide angle to the quasi-telephoto.

Related Background Art

In recent years, zoom lenses which have one end of a magnification change area on the wide angle side and which have a zoom magnification change ratio of about three times but in which F number on the telephoto side is darker than F3.5 have been variously proposed and known, as disclosed, for example, Japanese Laid-Open Patent Application No. 55-62419, Japanese Laid-Open Patent Application No. 56-114920, Japanese Laid-Open Patent Application No 57-168209 and Japanese Laid-Open Patent Application No. 59-57214. These known lenses each are a zoom lens comprising four positive, negative, positive and positive units and basically, a relatively high magnification is achieved by the arrangement or the like of the refractive powers of those four units, whereby compactness and low cost are achieved.

However, in these known zoom lenses, the fully open F number is relatively dark and sufficient aberration correction is not done and therefore, the imaging performance is bad and particularly, the fluctuations of curvature of image field, astigmatism and coma by magnification change are remarkable and these aberrations remain relatively greatly. Further, in comparison with the great and dark fully open F number, the correction of spherical aberration at the telephoto end has been insufficient. Also, the size of the entire lens system has been large for its small relative aperture and could hardly be said to be compact. Accordingly, an attempt to achieve a great relative aperture by the arrangement of refractive powers in this state has led to the problem that not only the degree of freedom of aberration correction is deficient, but also the lens units mechanically interfere with one another and the great relative aperture become difficult to realize.

On the other hand, a bright zoom lens comprising four positive, negative, positive and positive units and having achieved a great relative aperture in which the fully open F number is of the order of F2.8 in the entire magnification change range is also known, as disclosed, for example, in Japanese Patent Publication No. 46-43019.

However, again in this zoom lens disclosed in Japanese Patent Publication No. 46-43019, the correction of off-axial aberrations, particularly coma, has been insufficient and the fluctuation of coma by magnification change has been great, and this zoom lens has still been insufficient in respect of the imaging performance and has been difficult to intactly put into practical use.

SUMMARY OF THE INVENTION

Accordingly, it is an object of the present invention to solve the above-noted problems peculiar to the heretofore known zoom lenses and to provide a great relative aperture zoom lens of high performance in which the zoom magnification change ratio is about three times and which includes a wide angle and which has an F number as bright as about F2.8.

To achieve the above object, the zoom lens of the present invention includes, in succession from the object side, a first lens unit having positive refractive power, a second lens unit having negative refractive power, a third lens unit having positive refractive power, and a fourth lens unit having positive refractive power, and is designed such that during the magnification change from the wide angle end to the telephoto end, the first lens unit, the third lens unit and the fourth lens unit are moved toward the object side to thereby be displaced relative to the second lens unit, said second lens unit comprising a forward unit having negative refractive power and located on the object side and a rearward unit having positive refractive power and located on the image side, and is designed to satisfy the following condition:

$$-3 \leq f_{G2} \cdot h_{G2R}/f_T \leq -1.76,$$

where
- $f_{G2}$: the focal length of the second lens unit;
- $h_{G2R}$: the height of the ray from the on-axis infinity object point from a position at which said ray has passed the outermost marginal edge of that surface of the second lens unit which is most adjacent to the image side at the telephoto end to the optical axis;
- $f_T$: the focal length of the entire system at the telephoto end.

Also, it is desirable that the forward unit in the second lens unit be comprised, in succession from the object side, of a first lens component and a second lens component each having negative refractive power, or a first lens component having negative refractive power and a second lens component having positive refractive power and a third lens component having negative refractive power, and the rearward unit in the second lens unit be comprised of a lens component whose composite refractive power is positive.

Further, it is desirable that in addition to the second lens unit being designed to satisfy the above-mentioned condition, the third lens unit and the fourth lens unit be designed to satisfy the following conditions:

$$4.9 \leq f_{G3} \cdot h_{G3F}/f_T \leq 11$$

$$10.3 \leq f_{G4} \cdot h_{G4F}/f_T \leq 25$$

where
- $f_{G3}$: the focal length of the third lens unit;
- $f_{G4}$: the focal length of the fourth lens unit;
- $h_{G3F}$: the height of the ray from the on-axis infinity object point from the position at which said ray has passed the outermost marginal edge of that surface of the third lens unit which is most adjacent to the object side at the telephoto end to the optical axis;
- $h_{G4F}$: the height of the ray from the on-axis infinity object point from the optical axis at the position at which said ray has passed the outermost marginal edge of that surface which is most adjacent to the object side at the telephoto end;
- $f_T$: the focal length of the entire system at the telephoto end.

Since the zoom lens of the present invention is constructed as described above, there can be obtained an optical system in which each lens unit comprises a small number of lens components and can be constructed compactly and F number is as bright as about 2.8 and the zoom ratio amounts even to the order of three times and is moreover excellent in imaging performance over the whole magnification change range from the wide angle end to the telephoto end.

Other objects, features and effects of the present invention will become fully apparent from the following detailed description taken in conjunction with the accompanying drawings.

BRIEF DESCRIPTION OF THE DRAWINGS

FIGS. 1A-1C are lens construction views showing the lens arrangement of a first embodiment of the present invention at the wide angle end (the shortest focal length state) and the displaced state of each lens unit in the medium focal length state and at the telephoto end (the longest focal length state), respectively.

FIGS. 7A-7C are lens construction views showing the lens arrangement of a seventh embodiment of the present invention at the wide angle end (the shortest focal length state) and the displaced state of each lens unit in the medium focal length state and at the telephoto end (the longest focal length state), respectively.

DETAILED DESCRIPTION OF THE PREFERRED EMBODIMENTS

Figure 2A:
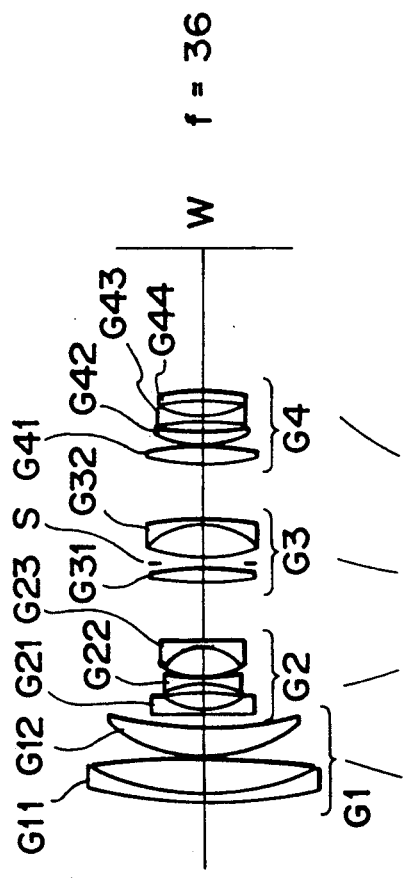
FIGS. 2A-2C are lens construction views showing the lens arrangement of a second embodiment of the present invention at the wide angle end (the shortest focal length state) and the displaced state of each lens unit in the medium focal length state and at the telephoto end (the longest focal length state), respectively.

Some embodiments of the present invention will hereinafter be described in detail with reference to the accompanying drawings.

Each embodiment of the present invention is a great relative aperture zoom lens of high magnification of which the focal length f is variable within a range of 36-102 and the F number amounts to as great as 2.9 and which covers a wide angle of view.

FIGS. 1A-1C to 3A-3C show first to third embodiments, respectively, of the present invention, and FIGS. 4A-4C to 7A-7C show fourth to seventh embodiments, respectively, of the present invention. Each embodiment, as basically shown in FIGS. 1A-1C, has, in succession from the object side, a first lens unit G1 having positive refractive power, a second lens unit G2 having negative refractive power, a third lens unit G3 having positive refractive power, and a fourth lens unit G4 having positive refractive power. During the magnification change from the shortest focal length state (hereinafter referred to as the "wide angle end") W to the longest focal length state (hereinafter referred to as the "telephoto end") T, the first lens unit G1 is moved rectilinearly (linearly) toward the object side and the third lens unit G3 and the fourth lens unit G4 are moved non-rectilinearly (non-linearly) toward the object side. Also, at that time, the second lens unit G2, in the sixth embodiment, is designed to be placed immovably, and in the other embodiments, is designed to be moved toward the image side. That is, the first lens unit G1, the third lens unit G3 and the fourth lens unit G4 are displaced relative to the second lens unit G2 so that the air gap between the first lens unit G1 and the second lens unit G2 may increase and the air gap between the second lens unit G2 and the third lens unit G3 and the air gap between the third lens unit G3 and the fourth lens unit G4 may decrease, whereby magnification change is effected from the wide angle end W to the telephoto end T.

Now, generally, in zoom lenses comprising four positive, negative, positive and positive units, and particularly in standard zoom lenses in which the magnification change ratio is about three times, lenses of which the F number is F3.5-F5.6 are the main stream and lenses of which the F number amounts to even F2.9 over the entire magnification change range as in the present invention are very rare.

Also generally, the second lens unit G2 in the zoom lens of this type comprising four positive, negative, positive and positive units has played a great role for the correction of off-axial aberration chiefly at the wide angle end. However, to make the relative aperture of this zoom lens intactly great, the burden for not only the off-axial aberrations on the wide angle side but also the on-axial aberrations on the telephoto side is greatly required of the second lens unit G2. Particularly, the correction of spherical aberration and downward coma on the telephoto side becomes more difficult and the burden for the aberration correction by the second lens unit G2 increases. Accordingly, if the rate of contribution to spherical aberration and coma particularly at the telephoto end is increased in the degree of freedom of the second lens unit G2 for aberration correction, the correction of distortion, curvature of image field, astigmatism, etc. on the wide angle side will become insufficient. So, in the present invention, in order to overcome this problem, the optical construction and optical refractive power arrangement of the second lens group G2 have been found out. That is, the second lens unit G2 comprises a forward unit having negative refractive power and located on the object side and a rearward unit having positive refractive power and located on the image side, and is designed to satisfy the following condition:

$$-3 \leq f_{G2} \cdot h_{G2R}/f_T \leq -1.76 \quad (1)$$

where $f_{G2}$: the focal length of the second lens unit G2;

$h_{G2R}$: the height of the ray from the on-axis infinity object point from the position at which said ray has passed the outermost marginal edge of that surface of the second lens unit G2 at the telephoto end to the optical axis;

$f_T$: the focal length of the entire system at the telephoto end.

By the optimal refractive power arrangement of the second lens group G2 as described above, even if an attempt is made to achieve a great relative aperture, it becomes possible to correct off-axial aberrations such as astigmatism, curvature of image field, downward coma and distortion well by a very simple lens construction and moreover at the wide angle end, and further correct spherical aberration and downward coma well at the telephoto end.

Also, to realize a great relative aperture, it is necessary that the height h of the ray which determines the fully open F number, i.e., the R and ray passing through the highest position in each lens unit (the ray from the on-axis infinity object point) from the optical axis be made great. The greater becomes this height h, the more marginal portion of the lens the ray passes through and therefore, an optimal refractive power arrangement becomes necessary so as to be advantageous in aberration correction.

The above-mentioned expression (1) prescribes an optimal condition regarding the height h of the R and ray passing through the highest position in the second lens unit G2 and the refractive power of the second lens unit G2, i.e., the relation of the optimal refractive index of the second lens unit G2 in the lens system of which the fully open F number is bright to the entire system.

If the lower limit of conditional expression (1) is exceeded, in a lens having a predetermined relative aperture, the negative focal length of the second lens unit G2 will become remarkably great as compared with the focal length of the entire system, and during magnification change, the amount of movement of the second lens unit G2 will become remarkably great. Therefore, to obtain a desired magnification change ratio, mechanical interference will result and a greater thickness of the second lens unit G2 will result and thus, it will become difficult to make the entire lens system compact.

If conversely, the upper limit of conditional expression (1) is exceeded, the negative focal length of the second lens unit G2 will become remarkably small as compared with the focal length of the entire system. Therefore, the spherical aberration on the telephoto side will become unable to be sufficiently corrected due to the deficiency of the degree of freedom particularly in aberration correction, and the fluctuation of spherical aberration by magnification change will also become great. So, if an attempt is made to correct this spherical aberration well, the degree of freedom in the correction of the other aberrations will be deficient and therefore, the correction of downward coma, astigmatism and curvature of image field will become difficult. Also, the negative refractive power of the second lens unit G2 will become strong, whereby the value of Petzval sum will become remarkably in the negative direction and therefore, the fluctuations of curvature of image field and astigmatism by magnification change will become great. Thus, to correct the fluctuations of these aberrations, the number of the lens components of the lens will have to be increased with a result that the lens system will become bulky.

Also, to construct the entire lens system of a small number of lenses and yet obtain an excellent imaging performance, it becomes very important to construct the second lens unit G2 as described above and in addition, make an optimal refractive power arrangement in at least the fourth lens unit G4 as well. So, it is desirable that the fourth lens unit G4 be designed to satisfy the following condition:

$$10.3 \leq f_{G4} \cdot h_{G4F}/f_T \leq 25 \tag{2}$$

where $f_{G4}$: the focal length of the fourth lens unit G4;

$h_{G4F}$: the height of the ray from the on-axis infinity object point from the position at which said ray has passed the outermost marginal edge of that surface of the fourth lens unit G4 which is most adjacent to the object side at the telephoto end to the optical axis;

$f_T$: the focal length of the entire system at the telephoto end.

Thereby, it becomes possible to achieve a great relative aperture zoom lens which is compact and has a good imaging performance.

If the lower limit of conditional expression (2) to exceeded, the focal length of the fourth lens unit G4 will become remarkably small as compared with the focal length of the entire system. Particularly in the case of a bright zoom lens, the degree of freedom with which each aberration is corrected will be remarkably reduced, and particularly the correction of upward coma at the wide angle end will become difficult and also, the fluctuations of upward coma, curvature of image field and astigmatism will become remarkable, and spherical aberration at the telephoto end will be aggravated. To effect aberration correction in this state the fourth lens unit G4 will become complicated and bulky, and this is not preferable.

If conversely, the upper limit of conditional expression (2) is exceeded, the focal length of the fourth lens unit G4 will become remarkably great as compared with the focal length of the entire system. This will result in the bulkiness of the fourth lens unit G4, and not only the outer diameter of the rear lens in this lens unit will become large, but also the amount of movement of the fourth lens unit G4 for magnification change will become great with a result that the entire system will become bulky, and this is not preferable.

Furthermore, to construct the entire lens system of a small number of lenses similarly to the fourth lens unit G4 and yet obtain an excellent imaging performance, it is desirable that the second lens unit G2 be constructed as described above and in addition, the third lens unit G3 be designed to satisfy the following condition:

$$4.9 \leq f_{G3} \cdot h_{G3F}/f_T \leq 11 \tag{3}$$

where $f_{G3}$: the focal length of the third lens unit G3;

$h_{G3F}$: the height of the ray from the on-axis infinity object point from the position at which said ray has passed the outermost marginal edge of that surface of the third lens unit G3 which is most adjacent to the object side at the telephoto end to the optical axis;

$f_T$: the focal length of the entire system at the telephoto end.

If the lower limit of the above-mentioned conditional expression (3) is exceeded, the focal length of the third lens unit G3 will become remarkably small as compared with the focal length of the entire system and therefore, the fluctuation of spherical aberration by magnification change will become remarkably great, and particularly the correction of spherical aberration on the telephoto side will become difficult. If the correction of spherical aberration is effected in this state, the number of the lens components of the third lens unit G3 will have to be increased with a result that the third lens unit G3 will become complicated and bulky, and this is not preferable.

If conversely, the upper limit of conditional expression (3) is exceeded, the focal length of the third lens unit G3 will become remarkably great as compared with the focal length of the entire system, and this is advantageous in the correction of aberrations, but not only the third lens unit G3 will become bulky (thick), but also the amount of movement of the third lens unit by magnification change will become great and the entire system will become bulky, and this is not preferable.

Further, to accomplish more sufficient aberration correction, it is desirable that the first lens unit G1 also be designed to satisfy the following condition:

$$1.7 \leq f_{G1}/f_W \leq 3 \qquad (4)$$

where
$f_{G1}$: the focal length of the first lens unit G1;
$f_W$: the focal length of the entire system at the wide angle end.

Conditional expression (4) prescribes the optimal focal length of the first lens unit G1 relative to the focal length of the entire system. If the lower limit of conditional expression (4) is exceeded, the refractive power of the first lens unit G1 will become strong relative to the other lens units and therefore, the degree of freedom in the correction of each aberration will be remarkably reduced and particularly, the correction of spherical aberration on the telephoto side and the correction of the fluctuation of spherical aberration by magnification change will become difficult and further, the correction of the fluctuation of downward coma by magnification change will also become difficult. If conversely, the upper limit of conditional expression (4) is exceeded, the principal ray which has entered the first lens unit G1 passes a position spaced apart from the optical axis of each lens and therefore, the effective diameter of the first lens unit G1 will become large with a result that the diameter of each lens will become large, and this is not preferable.

The first to third embodiments of the present invention shown in FIGS. 1A-1C to 3A-3C will now be described in greater detail.

Each of these embodiments is a very simple lens construction which, as shown, has, in succession from the object side, a positive first lens unit G1, a negative second lens unit G2, a positive third lens unit G3 and a positive fourth lens unit G4 and in which the negative second lens unit G2 is comprised, in succession from the object side, a forward unit comprising a negative first lens component G21 and a negative second lens component G22, and a rearward unit comprising a positive third lens component G23, and yet, by the optimal refractive index arrangement shown in conditional expression (1), it becomes possible to correct off-axial aberrations such as astigmatism, curvature of image field, downward coma and distortion well at the wide angle end and correct spherical aberration and downward coma well at the telephoto end.

Where as described above, the forward unit of the second lens unit G2 is comprised of the negative first lens component G21 and the negative second lens component G22, it is desirable that the value of conditional expression (1) be within the following range:

$$-3 \leq f_{G2} \cdot h_{G2R}/f_T \leq -2 \qquad (1a)$$

Furthermore, it is desirable that the lower limit value and upper limit value of conditional expression (1a) be $-2.5$ and $-2$, respectively, and the negative second lens unit be designed to satisfy this range. Thereby, it becomes possible to achieve a great relative aperture zoom lens which is more compact and has a better imaging performance and which has a high magnification and covers a wide angle of view.

Also, to make the second lens unit G2 function better for the aberrations as mentioned above and moreover construct the entire lens system of a small number of lenses and yet obtain an excellent imaging performance, it is important to design not only the negative second lens unit G2 as described above, but also to adopt the optimal refractive power arrangement as shown in conditional expression (2) for the positive fourth lens unit G4. To make the entire lens system more compact and obtain a more excellent imaging performance, it is desirable that the upper limit value of conditional expression (2) be 20 and the fourth lens unit be designed to satisfy this range. Furthermore, it is desirable that the positive third lens unit G3 prescribed in conditional expression (3) be designed to be within the following range:

$$5 \leq f_{G3} \cdot h_{G3f}/f_T \leq 9 \qquad (3a)$$

Still further, it is desirable that the lower limit value and upper limit value of conditional expression (3a) be 5.7 and 8.5, respectively, and the third lens unit be designed to satisfy this range. Thereby, it becomes possible to achieve a great relative aperture zoom lens which is more compact and has a better imaging performance and which has a high magnification and covers a wide angle of view. Now, to construct the second lens unit G2 of a small number of lenses to thereby achieve a great relative aperture and compactness, and yet obtain a more excellent imaging performance in all magnification change ranges, it is effective to provide an aspherical surface in the second lens unit G2. Thereby, the degree of freedom in the correction of the fluctuation of off-axis aberrations, particularly curvature of image field, distortion and downward coma, by magnification change can be markedly improved.

In this case, it is more desirable to satisfy the following conditional expression (5):

$$0.008 \leq |AS - S|/f_W \leq 0.05 \qquad (5)$$

where
$f_W$: the focal length of the entire system at the wide angle end;
AS-S : the difference in the direction of the optical axis between said aspherical surface on the outermost marginal portion of the effective diameter and a reference spherical surface having a predetermined vertex radius of curvature.

Conditional expression (5) is a condition regarding the effect of the aspherical surface in the second lens unit G2. This aspherical surface functions effectively particularly for the correction of downward coma at the wide angle end, the correction of the fluctuation of downward coma by magnification change, and further the correction of spherical aberration on the telephoto side. Therefore, conditional expression (5) prescribes the optimal shape of the aspherical surface for sufficiently obtaining the correction effect thereof.

If the lower limit of conditional expression (5) is exceeded, particularly in the case of a great relative aperture zoom lens, the effect of the aspherical surface will be remarkably reduced and the correction effect for the fluctuation of downward coma by magification change and downward coma on the wide angle side will be reduced. Further, the correction effect for spherical aberration on the telephoto side will be remarkably reduced and the correction of such aberration will become difficult, and the effect of the aspherical surface will become null. If conversely, the upper limit of conditional expression (5) is exceeded, the fluctuation of coma by the fluctuation of the angle of view will become very great due to the creation of high-order aberrations and also, the manufacture of the aspherical surface will become difficult. To obtain the effect of an aspherical surface effectively and yet provide an aspherical surface which is easy to manufacture and can ensure a reduced cost, it is more preferable that the upper limit value of conditional expression (5) be 0.03 and the aspherical surface be designed to satisfy this range.

Also, to accomplish more sufficient aberration correction, it is desirable that the value of the aforementioned conditional expression (4) be within the following range:

$$1.7 \leq f_{G1}/f_W \leq 2.55 \quad (4a)$$

where
- $f_{G1}$: the focal length of the first lens unit G1;
- $f_W$: the focal length of the entire system at the wide angle end.

This conditional expression (4a) prescribes the appropriate refractive power of the first lens unit G1. If the lower limit of conditional expression (4a) is exceeded, particularly the correction of the fluctuations of spherical aberration on the telephoto side and downward coma by magnification change will become difficult. Therefore, an attempt to correct the fluctuations of these aberrations will increase the number of constituent lenses of the first lens unit with a result that the lens system will become bulky and costly, and this is not preferable. If conversely, the upper limit of conditional expression (4a) is exceeded, the refractive power of the first lens unit G1 will become weak and the amount of movement of the first lens unit G1 during magnification change will become great. Therefore, on the telephoto side, the principal ray will pass through the marginal portion of the first lens unit G1, and this will lead to an increase in the diameter of the fore lens, which in turn will result in the bulkiness of the lens system. Also, the lens barrel holding the lens system will become bulky, and due to a problem such as eccentricity, the lens barrel will become difficult to design.

If design is made so as to satisfy conditional expression (4a), as can be seen from FIG. 1 which shows the lens construction of the first embodiment of the present invention, it will become possible to construct the first lens unit G1 of basically three lenses, i.e., a cemented positive lens G11 comprising a positive lens and a negative lens cemented thereto, and a positive lens G12.

Also, as described above, in the present invention, the second lens unit G2 is made into a construction having, in succession from the object side, a forward unit comprising the negative first lens component G21 and the negative second lens component G22, and a rearward unit comprising the positive third lens component G23 comprising a positive lens and a negative lens and having positive composite refractive power, whereby it has become possible to make the second lens unit function to correct off-axial aberrations such as astigmatism, curvature of image field, downward coma and distortion well at the wide angle end, and make the second lens unit function greatly for the correction of spherical aberration and downward coma at the telephoto end. To obtain the effect of the correction of these aberrations maximally, it is preferable that the positive third lens component G23 of the rearward unit in the second lens unit G2 be comprised, in succession from the object side, of a positive lens and a negative lens cemented thereto, and it is further preferable to satisfy the following conditional expressions (6) to (9):

$$2.5 \leq f_{G2R}/|f_{G2}| \leq 5.5 \quad (6)$$

$$0 < q_{G2R}/h_{G2R} \leq 0.15 \quad (7)$$

$$0.18/FN_T \leq D/f_T \leq 0.35/FN_t \quad (8)$$

$$0.09 \leq n_{2n} - n_{2P} \leq 0.22 \quad (9)$$

where
- $f_{G2R}$: the focal length of the third lens component G23 having positive refractive power in the second lens unit G2;
- $q_{G2R}$: a value defined by $q_{G2R} = (r_A + r_A)/(r_B - r_A)$ when the radius of curvature of that surface in the third lens component G23 having positive refractive power in the second lens unit G2 which is most adjacent to the object side is $r_A$ and the radius of curvature of that surface in the third lens component G23 which is most adjacent to the image side is $r_B$;
- D: the center thickness of the positive lens positioned adjacent to the object side of the third lens component G23 having positive refractive power in the second lens unit G2;
- $FN_T$: the F number during the opening at the telephoto end;
- $h_{G2R}$: the height (mm) of the ray from the on-axis infinity object point from the position at which said ray has passed the outermost marginal edge of that surface of the second lens unit G2 which is most adjacent to the image side at the telephoto end to the optical axis;
- $n_{2n}$: the refractive index of the negative lens in the third lens component G23 having positive refractive power in the second lens unit G2 for d line (587.6 nm);
- $n_{2p}$: the refractive index of the positive lens in the third lens component G23 having positive refractive power in the second lens unit G2 for d line (587.6 nm).

Conditional expressions (6) to (9) prescribe the conditions regarding the third lens component G23 having positive refractive power in the second lens unit G2. As previously described, the construction of the second lens unit G2 is a construction very important to make the effect of the present invention fully displayed, and particularly the third lens component G23 having positive refractive power plays an important role in realizing a bright zoom lens.

Conditional expression (6) shows the relation of the optimal rate of the focal length of the third lens component G23 of positive refractive power to the focal length of the second lens unit G2.

As previously described, this positive third lens component (cemented positive lens) G23 contributes particularly greatly to the correction of the fluctuation of spherical aberration by magnification change, the correction of spherical aberration on the telephoto side and further, the correction of downward coma. Accordingly, the optimal refractive power arrangement of the positive third lens component (cemented positive lens) G23 relative to the second lens unit G2 becomes necessary. If the lower limit of conditional expression (6) is exceeded, the refractive power of the positive third lens component (cemented positive lens) G23 will become strong and particularly the correction of spherical aberration on the telephoto side will become difficult. As the result, the refractive powers of the two negative lens components G21 and G22 in the second lens unit G2 will also become great and therefore, the balance of the correction of off-axial aberrations will be greatly destroyed, and particularly the fluctuations of distortion on the wide angle side, downward coma and curvature of image field will become very great. If conversely, the upper limit of conditional expression (6) is exceeded, the refractive power of the positive third lens component (cemented positive lens) G23 will become weak and it will become difficult to correct spherical aberration on the telephoto side and further, the value of Petzval sum will remarkably move in the negative direction and furthermore, astigmatism will be aggravated. Also, the valance of the correction of chromatic aberration in the second lens unit G2 will be destroyed and the fluctuation of chromatic difference of magnification will become very great. Also, to sufficinetly obtain the effect of the aberration correction by the positive third lens component (cemented positive lens) G23, it is desirable that the lower limit value of conditional expression (6) be 3.15 and this range be satisfied.

Conditional expression (7) is a condition showing the optimal relation between the height $h_{G2R}$ of a ray determining the fully open F number necessary for realizing a bright zoom lens, rearwardly of the second lens unit G2, i.e., an on-axial infinity ray passing the outermost marginal edge of that surface of the second lens unit G2 which is most adjacent to the image side, and the shape of the cemented positive lens (third lens component) G23. The brighter becomes the fully open F number, the greater becomes the height $h_{G2R}$ of the on-axial infinity ray passing the outermost marginal edge of that surface of the second lens unit G2 which is most adjacent to the image side, and particularly on the telephoto side, this light passes the more outer marginal edge of the third lens component (cemented positive lens) G23. Thus, the shape of the third lens component (cemented positive lens) G23 contributes greatly to the correction of spherical aberration on the telephoto side. Also, where a stop is disposed more adjacent to the image side than the second lens unit, the shape of the third lens component (cemented position lens) G23 relative to the step becomes important at the wide angle end as well.

If the lower limit of conditional expression (7) is exceeded, the third lens component (cemented positive lens) G23 will present a shape having a convex surface of weaker curvature facing the image side from a biconvex shape, and not only curvature of image field at the wide angle end and the fluctuation of downward coma by magnification change will become difficult to correct, but also the fluctuation of spherical aberration by magnification change will increase, and it will become difficult to realize a zoom lens of great relative aperture and high magnification. If conversely, the upper limit of conditional expression (7) is exceeded, it will be advantageous to the correction of aberrations created by the off-axial ray, but the third lens component (cemented positive lens) G23 will present a meniscus shape having its convex surface facing the object side and particularly, the degree of freedom in the correction of spherical aberration on the telephoto side will be reduced and the correction thereof will become difficult, and this is not preferable.

Conditional expression (8) is a condition for prescribing the optimal center thickness of the positive lens in the cemented positive lens (third lens component) G23. The center thickness of the positive lens in the third lens component (cemented positive lens) G23 play an important role particularly in the correction of spherical aberration on the telephoto side. Particularly, where an attempt is made to achieve a great relative aperture, it is necessary to utilize the center thickness of this positive lens sufficiently. If the lower limit of conditional expression (8) is exceeded, not only the correction of spherical aberration on the telephoto side will become difficult, but also the fluctuation of spherical aberration by magnification change will become very great and it will become impossible to realize a zoom lens of great relative aperture. If conversely, the upper limit of conditional expression (8) is exceeded, it will be advantageous to the correction of spherical aberration, but the second lens unit G2 will become thick with a result that the lens system will become bulky.

Conditional expression (9) shows the optimal difference in refractive index between the positive lens and the negative lens which constitute the cemented positive lens (third lens component) G23. If the lower limit of conditional expression (9) is exceeded, not only the correction of spherical aberration particularly on the telephoto side will become difficult, but also the value of Petzval sum will assume a remarkably negative value and therefore, astigmatism will be aggravated. If conversely, the upper limit of conditional expression (9) is exceeded, it will be advantageous to the correction of spherical aberration, but Petzval sum will assume a remarkably great positive value and therefore, astigmatism will be aggravated. To sufficiently obtain the effect by the optimal difference in refractive index between the positive lens and the negative lens which constitute the cemented positive lens G23, it is more desirable that the lower limit and upper limit of conditional expression (9) be 0.135 and 0.2, respectively, and this range be satisfied.

Each embodiment will now be described.

In the zoom lens of the first embodiment, as shown in FIG. 1, the positive first lens unit G1 comprises a cemented positive lens G11 comprising a negative meniscus lens having its convex surface facing the object side and a biconvex positive lens cemented thereto, and a positive meniscus lens G12 having its convex surface facing the object side, and the negative second lens unit G2 comprises a forward unit comprising a negative lens (first lens component) G21 having its concave surface facing the image side and a negative lens (second lens component) G22, and a cemented positive lens (third lens component) G23 which is a rearward unit comprising a positive lens having its surface of sharper curvature facing the image side and a negative lens cemented thereto. The positive third lens unit G3 comprises a biconvex positive lens G31 and a cemented positive lens G32 comprising a biconvex positive lens and a negative lens cemented thereto and having its convex surface facing the image side, and the positive fourth lens unit G4 comprises a biconvex positive lens G41, a positive meniscus lens G42 having its convex surface facing the object side, a negative lens G43 and a positive meniscus lens G44 having its convex surface facing the image side.

The aspherical surface in the first embodiment is provided on that surface of the negative lens (first lens component) G21 of the second lens unit G2 positioned most adjacent to the object side which is adjacent to the image side, and is also provided on that surface (the last surface) of the positive lens G44 of the fourth lens unit G4 positioned most adjacent to the image side which is adjacent to the image side. An aperture stop S is disposed on the object side of the third lens unit G3.

Figure 2B:
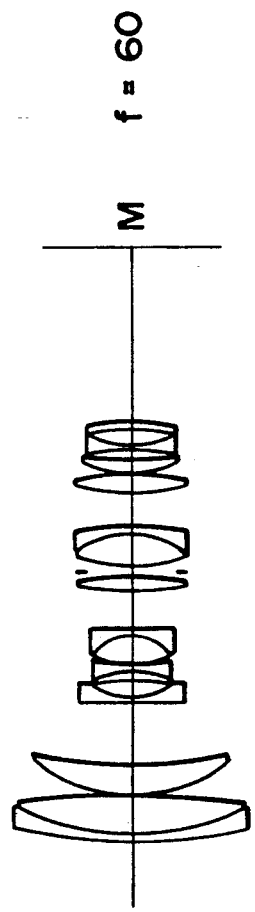
Figure 2C:
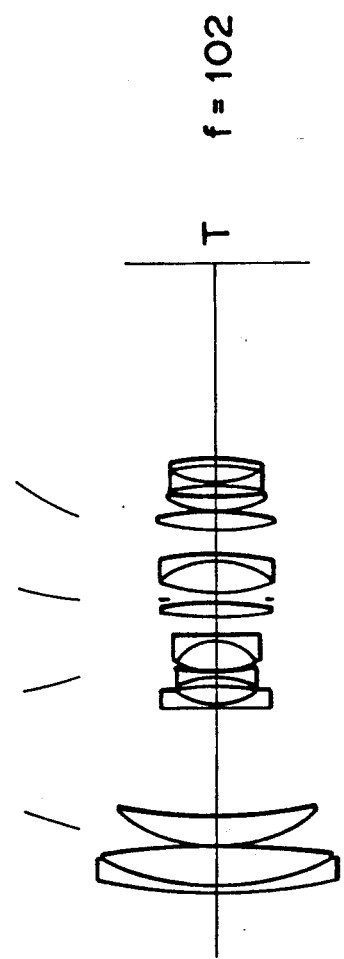
Figures 3A, 3B, 3C:
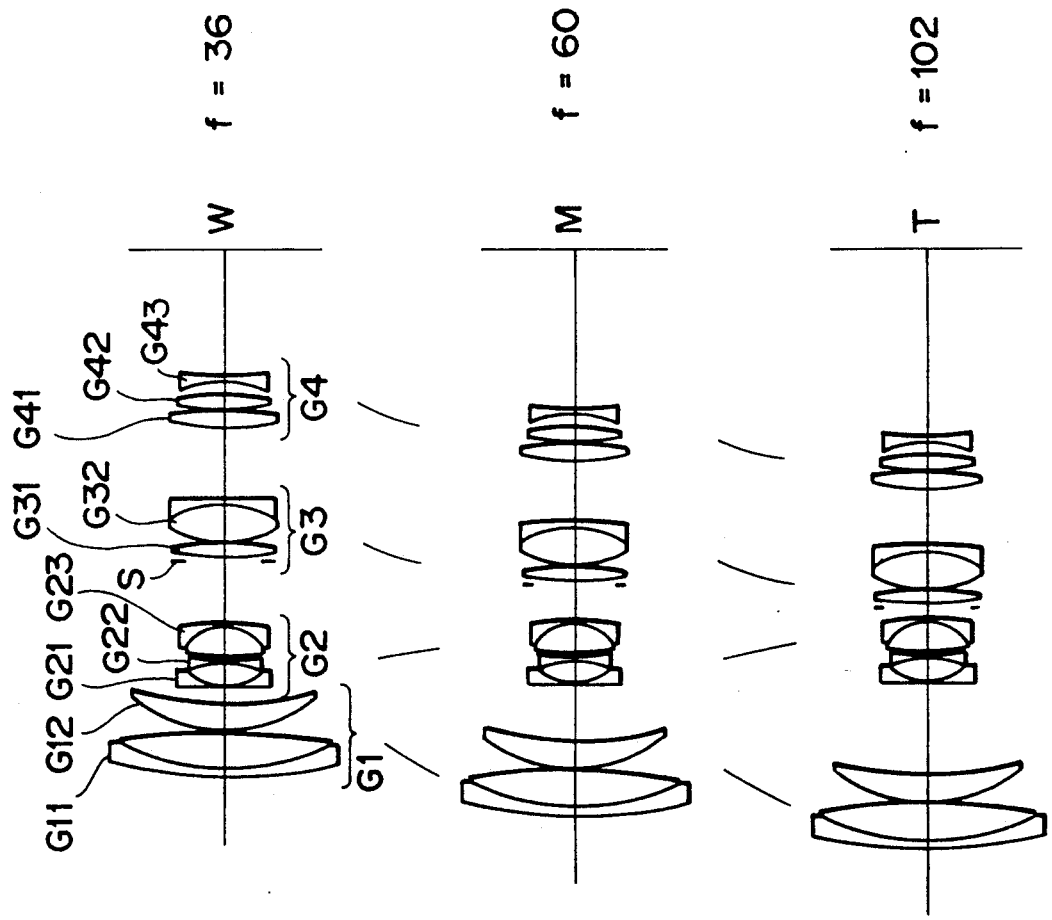
FIGS. 3A-3C are lens construction views showing the lens arrangement of a third embodiment of the present invention at the wide angle end (the shortest focal length state) and the displaced state of each lens unit in the medium focal length state and at the telephoto end (the longest focal length state), respectively.
Figures 4A, 4B, 4C:
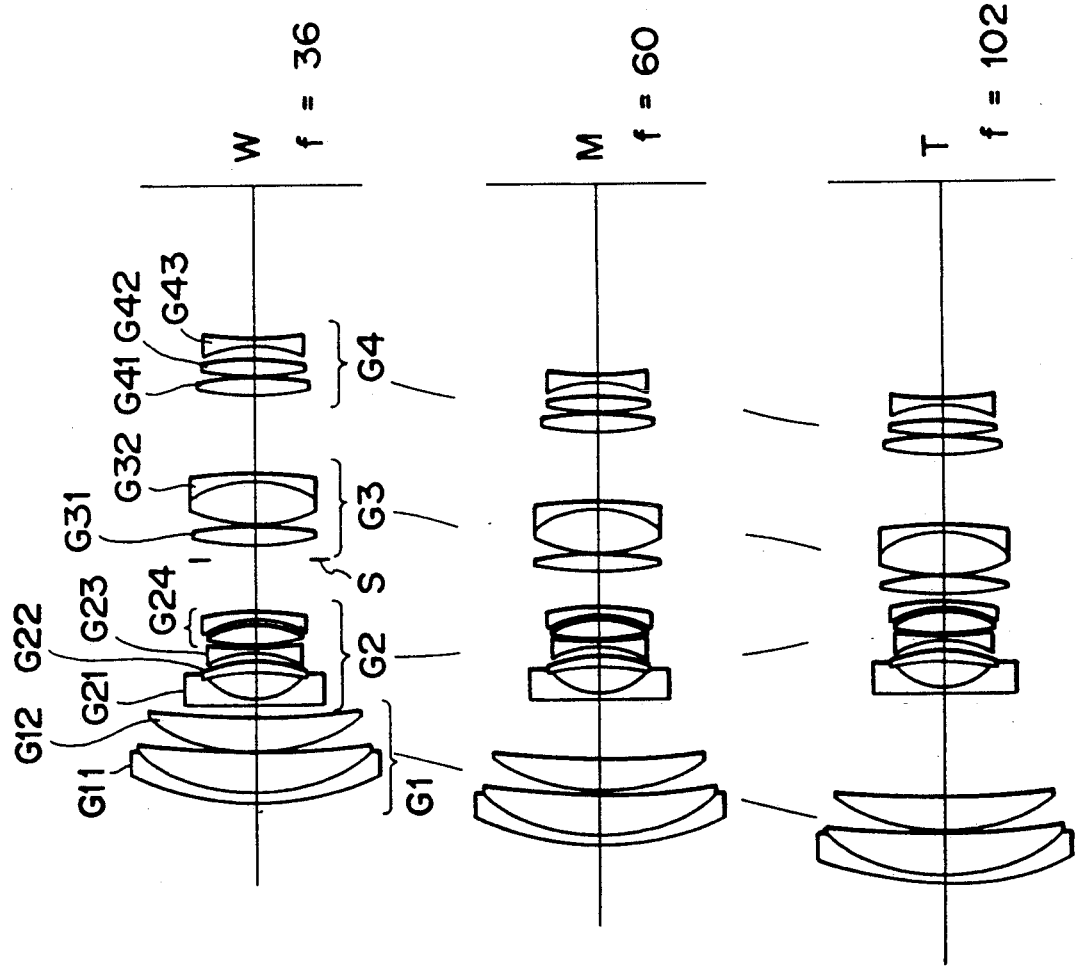
FIGS. 4A-4C are lens construction views showing the lens arrangement of a fourth embodiment of the present invention at the wide angle end (the shortest focal length state) and the displaced state of each lens unit in the medium focal length state and at the telephoto end (the longest focal length state), respectively.

The zoom lens of the second embodiment, as shown in FIG. 2, basically has a construction similar to that of the zoom lens of the first embodiment, but the negative second lens component G22 in the second lens unit G2 is a cemented lens. The second lens component G22 of this cemented negative lens comprises, in succession from the object side, a positive meniscus lens having its convex surface facing the image side, and a biconcave negative lens cemented thereto.

The aspherical surface in the second embodiment is provided on that surface of the negative lens (first lens component) G21 of the second lens unit G2 positioned most adjacent to the object side which is adjacent to the image side, and is also provided on that surface of the positive lens G44 of the fourth lens unit G4 positioned most adjacent to the image side which is adjacent to the object side. These aspherical surfaces each is comprised of a compound aspherical surface (a hybrid lens) of a spherical glass lens and a plastic material. The aperture stop S in the second embodiment is disposed in the third lens unit G3.

In the zoom lens of the third embodiment, as shown in FIG. 3, the first to third lens units have a construction similar to that of the zoom lens of the first embodiment, but the fourth lens unit G4 differs in construction from that in the first embodiment. That is, the fourth lens unit G4 comprises three single lenses, i.e., a biconvex positive lens G41, a biconvex positive lens G42 and a negative lens G43.

The aspherical surface in the third embodiment is provided on that surface of the negative lens (first lens component) G21 of the second lens unit G2 positioned most adjacent to the object side which is adjacent to the object side, and is also provided on that surface of the negative lens G43 of the fourth lens unit G4 positioned most adjacent to the image side which is adjacent to the object side. The aperture stop S in the third embodiment is disposed on the object side of the third lens unit G3.

In all of the embodiments described above, the aspherical surface is provided in the fourth lens unit, except for the second lens unit, and this arrangement effectively performs to improve the degree of freedom of the correction of upward coma and the correction of the fluctuation of curvature of image field by magnification and the fluctuation of spherical aberration. To obtain the effect of the aspherical surfaces more effectively at this time, it is desirable that design be made so as to satisfy conditional expression (5). Of course, an aspherical surface may be provided in the third lens unit G3.

Further, the aspherical surface disposed in the second lens unit G2 may be provided on any surface of any lens disposed in the second lens unit G2, but to make the aspherical surface function more effectively for the correction of off-axial aberrations and obtain the effect of the present invention sufficiently, it is desirable that this aspherical surface be disposed on that lens surface in the second lens unit G2 which is as adjacent as possible to the object side.

Also, the aspherical lenses in the first to third embodiments use compound aspherical surfaces (hybrid lenses) of glass and a plastic material in order to facilitate the manufacture and reduce the cost, but of course, the aspherical lenses may also be formed of only a glass material.

Now, the numerical values and condition corresponding numerical values of the first to third embodiments of the present invention will be successively given below.

In the tables below, the numbers at the left end represent the order from the object side, r represents the radius of curvature of each lens surface, d represents the spacing between adjacent lens surfaces, $\nu$ represents the Abbe number ($\nu d$), n represents the refractive index for d line ($\lambda = 587.6$ nm), f represents the focal length of the entire system, FN represents the F number, and $\phi$ represents the effective diameter of the aspherical lens. Also, the aspherical surface shown in the numerical values is expressed by $$X(h) = (h^2/r)/[1+(1-Kh^2/r^2)^{\frac{1}{2}}] + C2\, h^2 + C4\, h^4 + C6\, h^6 + C8\, h^8 + C10\, h^{10}$$

where X(h) is the distance, along the direction of the optical axis, of the vertex of each aspherical surface at a height y in the vertical direction from the optical axis, from the tangential plane, r is the reference paraxial radius of curvature, k is the cone coefficient, and Cn is the nth-order aspherical surface coefficient. Also, $E^{-n}$ at the left end in the nth-order aspherical surface coefficient Cn indicates $10^{-n}$.

TABLE 1

| [First Embodiment] | | | |
|---|---|---|---|
| r | d | $\nu$ | n |
| 1 | 142.768 | 2.50 | 23.0 | 1.86074 |
| 2 | 73.483 | 12.40 | 70.0 | 1.51860 |
| 3 | −280.849 | 0.10 | | |
| 4 | 45.375 | 9.00 | 60.7 | 1.56384 |
| 5 | 124.562 | (variable) | | |
| 6 | 418.949 | 2.00 | 52.3 | 1.74810 |
| 7 | 18.477 | 5.55 | | |
| 8 | −51.766 | 2.00 | 43.4 | 1.84042 |
| 9 | 76.133 | 0.35 | | |
| 10 | 33.856 | 9.00 | 25.5 | 1.73038 |
| 11 | −15.704 | 1.70 | 35.7 | 1.90265 |
| 12 | −443.341 | (variable) | | |
| 13 | 126.681 | 4.00 | 65.8 | 1.46450 |
| 14 | −97.873 | 0.20 | | |

TABLE 1-continued

[First Embodiment]

| | | | | |
|---|---|---|---|---|
| 15 | 46.279 | 11.00 | 58.9 | 1.51823 |
| 16 | −26.974 | 2.00 | 23.0 | 1.86074 |
| 17 | −70.750 | (variable) | | |
| 18 | 59.247 | 6.50 | 40.9 | 1.79631 |
| 19 | −76.390 | 0.15 | | |
| 20 | 30.786 | 3.90 | 56.0 | 1.56883 |
| 21 | 66.406 | 3.35 | | |
| 22 | −102.300 | 1.85 | 33.9 | 1.80384 |
| 23 | 29.128 | 4.30 | | |
| 24 | −124.935 | 3.60 | 58.9 | 1.51823 |
| 25 | −45.970 | (Bf) | | |
| f | 36.0000 | 59.9999 | 102.0002 | |
| d5 | 3.4087 | 18.5718 | 31.7962 | |
| d12 | 20.1182 | 13.6283 | 7.5055 | |
| d17 | 13.2124 | 7.0392 | 3.8684 | |
| Bf | 44.9643 | 53.7309 | 59.9710 | |

7th surface (aspherical surface)

Reference paraxial radius of curvature: $r = 18.477$
Cone coefficient: $k = 1$
Aspherical surface coefficient
$C2 = 0$, $C4 = -0.1729E^{-5}$, $C6 = 0.4735E^{-7}$,
$C8 = 0.3062E^{-9}$, $C10 = -0.2365E^{-11}$ 24th surface (aspherical surface)

Reference paraxial radius of curvature: $r = -124.935$
Cone coefficient: $k = 1$
Aspherical surface coefficient
$C2 = 0$, $C4 = -0.9195E^{-5}$, $C6 = -0.2412E^{-7}$,
$C8 = 0.1272E^{-9}$, $C10 = -0.4185E^{-12}$
$f_{G2} \cdot h_{G2R}/f_T = -2.04$
$f_{G3} \cdot h_{G3F}/f_T = 7.64$
$f_{G4} \cdot h_{G4F}/f_T = 12.37$
$|AS-S|/fw = 0.00275 \ldots$ 7th surface ($\phi = 21.8$)
$f_{G1}/f_W = 2.44$
$f_{G2R}/|f_{G2}| = 4.25$
$q_{G2R}/h_{G2R} = 0.0714$
$D/f_T = 0.0882 \ldots FN_T = 2.9$
$n_{2n}-n_{2P} = 0.172$

TABLE 2

[Second Embodiment]

| | r | d | υ | n |
|---|---|---|---|---|
| 1 | 160.001 | 2.20 | 23.0 | 1.86074 |
| 2 | 77.254 | 11.50 | 70.0 | 1.51860 |
| 3 | −264.690 | 0.10 | | |
| 4 | 46.775 | 8.50 | 60.1 | 1.62041 |
| 5 | 121.025 | (variable) | | |
| 6 | 829.431 | 1.70 | 52.3 | 1.74810 |
| 7 | 22.000 | 0.03 | 55.9 | 1.49712 |
| 8 | 19.522 | 5.55 | | |
| 9 | −68.286 | 2.50 | 35.5 | 1.59507 |
| 10 | −31.061 | 1.70 | 45.4 | 1.79668 |
| 11 | 62.248 | 0.35 | | |
| 12 | 34.730 | 9.00 | 27.8 | 1.69911 |
| 13 | −14.755 | 1.70 | 39.8 | 1.86994 |
| 14 | −292.136 | (variable) | | |
| 15 | 94.290 | 4.30 | 65.8 | 1.46450 |
| 16 | −100.001 | 3.00 | | |
| 17 | 46.323 | 10.30 | 58.9 | 1.51823 |
| 18 | −27.173 | 2.00 | 23.0 | 1.86074 |
| 19 | −77.467 | (variable) | | |
| 20 | 57.255 | 6.00 | 40.9 | 1.79631 |
| 21 | −75.244 | 0.15 | | |
| 22 | 30.552 | 3.90 | 56.0 | 1.56883 |
| 23 | 88.801 | 3.35 | | |
| 24 | −97.793 | 1.85 | 33.9 | 1.80384 |
| 25 | 28.388 | 4.80 | | |
| 26 | −80.750 | 0.05 | 55.9 | 1.49712 |
| 27 | −70.000 | 2.50 | 58.9 | 1.51823 |
| 28 | −50.329 | (Bf) | | |
| f | 35.9999 | 60.0000 | 102.0008 | |
| d5 | 4.0893 | 19.2524 | 32.4768 | |
| d14 | 18.1332 | 11.6433 | 5.5205 | |
| d19 | 15.9310 | 9.7578 | 6.5870 | |
| Bf | 43.1230 | 51.8897 | 58.1296 | |

8th surface (aspherical surface)

TABLE 2-continued

[Second Embodiment]

Reference paraxial radius of curvature: $r = 19.522$
Cone coefficient: $k = 1$
Aspherical surface coefficient
$C2 = 0$, $C4 = -0.4461E^{-5}$, $C6 = -0.1156E^{-6}$,
$C8 = 0.6830E^{-9}$, $C10 = -0.4316E^{-11}$ 26th surface (aspherical surface)

Reference paraxial radius of curvature: $r = -80.750$
Cone coefficient: $k = 1$
Aspherical surface coefficient
$C2 = 0$, $C4 = -0.9459E^{-5}$, $C6 = -0.331E^{-7}$,
$C8 = 0.1960E^{-9}$, $C10 = -0.6054E^{-12}$
$f_{G2} \cdot h_{G2R}/f_T = -2.08$
$f_{G3} \cdot h_{G3F}/f_T = 7.51$
$f_{G4} \cdot h_{G4F}/f_T = 12.47$
$|AS-S|/fw = 0.01040 \ldots$ 8th surface ($\phi = 23.8$)
$f_{G1}/f_W = 2.44$
$f_{G2R}/|f_{G2}| = 4.66$
$q_{G2R}/h_{G2R} = 0.0641$
$D/f_T = 0.0882 \ldots FN_T = 2.9$
$n_{2n}-n_{2P} = 0.171$

TABLE 3

[Third Embodiment]

| | r | d | υ | n |
|---|---|---|---|---|
| 1 | 146.457 | 2.50 | 23.0 | 1.86074 |
| 2 | 73.024 | 11.50 | 64.1 | 1.51680 |
| 3 | −189.533 | 0.10 | | |
| 4 | 44.101 | 8.50 | 60.1 | 1.62041 |
| 5 | 106.011 | (variable) | | |
| 6 | 103.749 | 1.50 | 49.5 | 1.77279 |
| 7 | 18.090 | 6.50 | | |
| 8 | −26.398 | 1.50 | 45.4 | 1.79668 |
| 9 | 125.417 | 0.20 | | |
| 10 | 48.765 | 9.00 | 27.8 | 1.69911 |
| 11 | −15.829 | 1.50 | 43.4 | 1.84042 |
| 12 | −69.654 | (variable) | | |
| 13 | 83.090 | 4.50 | 64.1 | 1.51680 |
| 14 | −73.258 | 0.20 | | |
| 15 | 38.601 | 11.00 | 58.9 | 1.51823 |
| 16 | −29.849 | 2.00 | 23.0 | 1.86074 |
| 17 | −138.715 | (variable) | | |
| 18 | 60.854 | 6.00 | 40.9 | 1.79631 |
| 19 | −91.396 | 0.10 | | |
| 20 | 72.680 | 5.00 | 58.9 | 1.51823 |
| 21 | −61.765 | 3.50 | | |
| 22 | −35.691 | 2.00 | 35.7 | 1.90265 |
| 23 | 105.287 | (variable) | | |
| f | 35.9965 | 59.9998 | 101.9998 | |
| d5 | 3.8115 | 15.8970 | 26.6032 | |
| d12 | 19.5387 | 11.6067 | 4.0902 | |
| d17 | 21.0986 | 18.2634 | 16.2417 | |
| Bf | 38.1196 | 47.7880 | 56.3529 | |

6th surface (aspherical surface)

Reference paraxial radius of curvature: $r = 103.749$
Cone coefficient: $k = 1$
Aspherical surface coefficient
$C2 = 0$, $C4 = 0.1056E^{-5}$, $C6 = 0.1251E^{-7}$,
$C8 = -0.8668E^{-10}$, $C10 = 0.2457E^{-12}$ 22th surface (aspherical surface)

Reference paraxial radius of curvature: $r = -35.691$
Cone coefficient: $k = 1$
Aspherical surface coefficient
$C2 = 0$, $C4 = -0.4476E^{-5}$, $C6 = 0.1070E^{-7}$,
$C8 = -0.4857E^{-10}$, $C10 = 0.1316E^{-12}$
$f_{G2} \cdot h_{G2R}/f_T = -2.27$
$f_{G3} \cdot h_{G3F}/f_T = 6.64$
$f_{G4} \cdot h_{G4F}/f_T = 13.62$
$|AS-S|/fw = 0.00197 \ldots$ 6th surface ($\phi = 27.5$)
$f_{G1}/f_W = 2.22$
$f_{G2R}/|f_{G2}| = 3.23$
$q_{G2R}/h_{G2R} = 0.0137$
$D/f_T = 0.0882 \ldots FN_T = 2.9$
$n_{2n}-n_{2P} = 0.141$ As can be seen from the numerical values of each embodiment, there is achieved a high magnification zoom lens in which each lens unit is compactly constructed of a smallest possible number of lenses and yet F number is as bright as about 2.8 and moreover the zoom ratio amounts to even 2.83 and which covers a wide angle of view.

In each of the above-described embodiments, aberrations are corrected well over the wide angle end to the telephoto end, and each embodiment has an excellent imaging performance.

The focusing of each embodiment of the present invention is effected by the inner focus system in which the second lens unit and the third lens unit are moved toward the object by a certain predetermined ratio, or the rear focus system in which the third lens unit and the fourth lens unit are moved toward the object by a certain predetermined ratio, whereby a zoom lens of high performance to a short distance can be realized. Also, it is desirable that the aperture stop S be set at a position more adjacent to the image side than the second lens unit to a position more adjacent to the object side than the fourth lens unit, and the aperture stop may be moved discretely from each unit for magnification change.

Also, each of the above-described embodiments of the present invention has been shown with respect to a case where the negative first lens component G21 in the second lens unit G2 is comprised of a single lens, but of course, this first lens component G21 may be comprised of a cemented lens comprising a positive lens and a negative lens cemented together.

The fourth to seventh embodiments of the present invention shown in FIGS. 4A-4C to 7A-7C will now be described in greater detail.

Each of these embodiments, as shown, has, in succession from the object side, a positive first lens unit G1, a negative second lens unit G2, a positive third lens unit G3 and a positive fourth lens unit G4, and further, the negative second lens unit G2 is comprised, in succession from the object side, a forward unit comprising a first lens component G21 having a negative refractive index, a second lens component G22 having positive refractive power and a third lens component G23 having a negative refractive index, and a rearward unit comprising a fourth lens component G24 having a positive refractive index.

Thus, spherical aberration at the wide angle end is corrected well by the positive fourth lens component G24 positioned most adjacent to the image side, and downward coma and distortion are corrected well by greatly flipping up an off-axial ray by the position second lens component G22 in the second lens unit G2. Also, spherical aberration on the telephoto side is well-balancedly shared by the positive fourth lens component G24 positioned most adjacent to the image side, the positive second lens component G22 and negative third lens component G23 in the second lens unit G2, and an air lens formed between the second lens component G22 and the negative third lens component G23, whereby spherical aberration on the telephoto side is corrected well.

Accordingly, by the appropriate refractive power arrangement of the second lens unit G2 according to the present invention shown in conditional expression (1), and the characteristic construction as described above, off-axial aberrations such as astigmatism, curvature of image field, downward coma and distortion at the wide angle end are corrected well-balancedly even if a great relative aperture is contrived, and it has become possible to correct spherical aberration and downward coma at the telephoto end well, too.

As described above, the great relative aperture zoom lens according to the present invention has its feature in the construction of the second lens unit G2, and the negative, positive, negative and positive lens components constituting this second lens unit G2 play important roles in aberration correction. Therefore, the refractive power distribution of the second lens unit G2 is very important.

Conditional expression (1), as previously described, is a condition which prescribes the relation of the optimal refractive power to the entire system of the second lens unit G2 in a lens system wherein the fully open F number is bright. That is, if the lower limit of conditional expression (1) is exceeded, in a lens having a certain predetermined relative aperture, the negative focal length of the second lens unit G2 will become remarkably great as compared with the focal length of the entire system. Therefore, the amount of movement of the second lens unit G2 by magnification change will become remarkably great and an attempt to obtain a desired magnification change ratio will result in the mechanical interference between adjacent lens units and also will result in a great thickness of the second lens unit, with a result that the entire system will become bulky. If conversely, the upper limit of conditional expression (1) is exceeded, in a lens system having a certain predetermined relative aperture, the negative focal length of the second lens unit G2 will become remarkably small relative to the focal length of the entire system and therefore, particularly in the case of a lens of which the fully open F number is bright, spherical aberration on the telephoto side will become unable to be sufficiently corrected due to the deficiency of the degree of freedom is aberration correction and also, the fluctuations of aberrations by magnification change will become great. So, if an attempt is made to correct this spherical aberration well, the correction of downward coma, astigmatism and curvature of image field will become difficult because of the deficiency of the degree of freedom in the correction of the other aberrations. Also, the negative refractive power of the second lens unit G2 will become strong and therefore, the value of Petzval sum will move in the negative direction, whereby astigmatism and curvature of image field will be aggravated. This will result in an increase in the number of lenses in each lens unit and the complication of each lens unit, and the bulkiness of the lens system will be unavoidable.

Also, to construct the entire lens system of a small number of lenses and yet obtain an excellent imaging performance, it is preferable that not only the second lens unit G2 but also the fourth lens unit G4, the third lens unit G3 and the first lens unit G1 prescribed in the aforementioned conditional expressions (2), (3) and (4), respectively, be designed so as to be within the following numerical value ranges:

$$10.4 \leq f_{G4} \cdot h_{G4F}/f_T \leq 16.5 \tag{2b}$$

$$4.9 \leq f_{G3} \cdot h_{G3F}/f_T \leq 11 \tag{3b}$$

$$2 \leq f_{G1}/f_W \leq 3 \tag{4b}$$

where $f_{G3}$: the focal length of the third lens unit G3;

$f_{G4}$: the focal length of the fourth lens unit G4;

$h_{G3F}$: the height of the ray from the on-axis infinity object point from the position at which said ray has passed the outermost marginal edge of that surface of the third lens unit G3 which is most adjacent to the object side at the telephoto end to the optical axis;

$h_{G4F}$: the height of the ray from the on-axis infinity object point from the position at which said ray has passed the outermost marginal edge of that surface of the fourth lens unit G4 which is most adjacent to the object side at the telephoto end to the optical axis;

$f_{G1}$: the focal length of the first lens unit G1;

$f_W$: the focal length of the entire system at the wide angle end.

Conditional expressions (2b)–(4b) will hereinafter be described.

Conditional expression (2b), like the aforementioned conditional expression (1), is a conditional expression which prescribes the relation of the appropriate refractive power to the entire system of the fourth lens unit G4 in a lens system wherein the fully open F number is small and bright. If the lower limit of conditional expression (2b) is exceeded, the refractive power of the fourth lens unit G4 will become remarkably strong as compared with the entire system and the degree of freedom with which each aberration is corrected will be remarkably reduced. Particularly, the correction of upward coma on the wide angle side will become difficult and also, the fluctuation of upward coma by magnification change will become very great. The correction of spherical aberration on the telephoto side will also become difficult and the fluctuation of spherical aberration by magnification change will also become very great. If conversely, the upper limit of conditional expression (2b) is exceeded, the refractive power of the fourth lens unit G4 will become remarkably weak as compared with that of the other lens units, with a result that the fourth lens unit G4 will become bulky and the amount of movement of the fourth lens unit G4 for magnification change will become great. As a result, the entire system will become bulky, and this is not preferable.

Conditional expression (3b), like the aforementioned conditional expression (1), is a conditional expression which prescribes the relation of the appropriate refractive power to the entire system of the third lens unit G3 in a lens system wherein the fully open F number is small and bright. If the lower limit of conditional expression (3b) is exceeded, the refractive power of the third lens unit G3 will become remarkably strong and particularly, the correction of spherical aberration on the telephoto side will become difficult. Also, it will become difficult to correct the fluctuation of spherical aberration by magnification change. So, if an attempt is made to correct these aberrations well, it will not only adversely affect the correction of the other aberrations, but also will result in the complication and greater thickness of the third lens unit G3, and this is not preferable. If conversely, the upper limit of conditional expression (3b) is exceeded, the refractive power of the third lens unit G3 will become remarkably weak as compared with that of the other lens units and therefore, the third lens unit G3 will become bulky and the amount of movement of the third lens unit G3 by magnification change will become great with a result that the entire system will become bulky, and this is not preferable.

Conditional expression (4b) prescribes the optimal focal length of the first lens unit G1 relative to the focal length of the entire system. If the lower limit of conditional expression (4b) is exceeded, the refractive power of the first lens unit G1 will become strong relative to that of the other lens units and therefore, the degree of freedom in the correction of each aberration will be remarkably reduced and particularly, the correction of spherical aberration on the telephoto side and the correction of the fluctuation of spherical aberration by magnification change will become difficult, and the correction of the fluctuation of downward coma by magnification change will also become difficult. If conversely, the upper limit of conditional expression (4b) is exceeded, the principal ray which has entered the first lens unit G1 will pass a location more spaced apart from the optical axis of each lens and therefore, not only the effective diameter of the first lens unit G1 will become large, but also the filter size will become remarkably large. As a result, the diameter of each lens constituting the lens system will become large, and this is not preferable.

While in the fourth to seventh embodiments of the present invention, the second lens unit G2 is comprised, in succession from the object side, of four negative, positive, negative and positive lens components, it is desirable that among those lens components, the positive lens component G24 positioned most adjacent to the image side be comprised of at least two positive and negative lenses cemented together or separated from each other for the correction of spherical aberration and chromatic aberration and the appropriate setting of Petzval sum.

Also, to minimize the number of lens components and thereby achieve a reduction in cost and the compactness of the lens system and yet achieve more sufficient aberration correction, it is desirable that at least one lens surface be formed into an aspherical surface, and it is particularly preferable that an aspherical surface be provided in a lens of the second lens unit G2. Thereby, the fluctuation of downward coma and the fluctuation of curvature of image field resulting from the movement of the second lens unit G2 during magnification change can be decreased. Also, the action of effectively correcting downward coma at the wide angle end and negative distortion can be given. As a result, the second lens unit G2 can be made thinner and therefore, the compactness of the great relative aperture zoom lens can be achieved. It is preferable that the aspherical surface in this case, as in the first to third embodiments, satisfy the following condition:

$$0.0005 \leq |AS - S|/f_W \leq 0.05 \quad (5)$$

where

AS−S: the difference in the direction of the optical axis between said aspherical surface on the outermost marginal edge of the effective diameter and a reference spherical surface having a predetermined vertex radius of curvature.

Conditional expression (5) prescribes an appropriate amount of displacement along the direction of the optical axis from the aspherical surface on the outermost marginal edge of the effective diameter to the reference spherical surface. If the lower limit of conditional expression (5) is exceeded, the correction effect for negative distortion and downward coma will extremely decrease and the effect of the aspherical surface will become null. If conversely, the upper limit of conditional expression (5) is exceeded, high-order aberrations will be created, whereby the fluctuation of coma by the fluctuation of the angle of view will become extremely great, and the manufacture of the aspherical surface will become difficult.

Also, to provide a great relative aperture and thereby sufficiently obtain the effect of aberration correction borne by the second lens unit G2, as previously described, it is desirable that the following condition be satisfied:

$$0 < n_{G23} - n_{G22} < 0.4, \qquad (10)$$

where $n_{G23}$: the refractive index of the third lens component G23 having negative refractive power in the second lens unit G2 for d line (587.6 nm);

$n_{G22}$: the refractive index of the second lens component G22 having positive refractive power in the second lens unit G2 for d line (587.6 nm).

If the lower limit of conditional expression (10) is exceeded, the value of Petzval sum will move remarkably in the negative direction and the correction of astigmatism and curvature of image field will become difficult. If conversely, the upper limit of conditional expression (10) is exceeded, the radius of curvature of that surface of the positive second lens component G22 in the second lens unit G2 which is adjacent to the image side will become remarkably small, and due to the creation of high-order aberrations, the fluctuation of particularly downward coma by the angle of view will become very great, and this is not preferable.

It is desirable that one more aspherical surface be provided on such a lens surface that the off-axial light beam passes a high position in the effective diameter of the lens, i.e., a lens in the fourth lens unit G4 which is relatively adjacent to the image side. Thereby, chiefly upward coma and curvature of image field can be effectively corrected and a great relative aperture zoom lens of higher performance can be realized. In this case, it is more preferable that the aspherical surface to be provided in the fourth lens unit G4 satisfy the above-mentioned conditional expression (5).

As regards focusing, a zoom lens of high performance having an excellent imaging performance from infinity to a close distance can be achieved by the so-called rear focus system in which the third lens unit G3 and the fourth lens unit G4 are moved toward the object at a certain predetermined ratio, or the inner focus system in which the second lens unit G2 and the third lens unit G3 are moved toward the object at a certain predetermined ratio.

The fourth to seventh embodiments of the present invention will now be described in greater detail.

Each of these embodiments is a high magnification zoom lens of which the focal length f is variable from 36 to 102 and which covers the brightness of F number reaching even 2.9 and a wide angle of view.

Also, each embodiment, as shown in FIG. 4, basically has, in succession from the object side, a first lens unit G1 having positive refractive power, a second lens unit G2 having negative refractive power, a third lens unit G3 having positive refractive power and a fourth lens unit G4 having positive refractive power. Each embodiment is designed such that during the magnification change from the wide angle end to the telephoto end, the air gap between the first lens unit G1 and the second lens unit G2 increases, the air gap between the second lens unit G2 and the third lens unit G3 decreases and the air gap between the third lens unit G3 and the fourth lens unit G4 decreases.

Figures 6A, 6B, 6C:
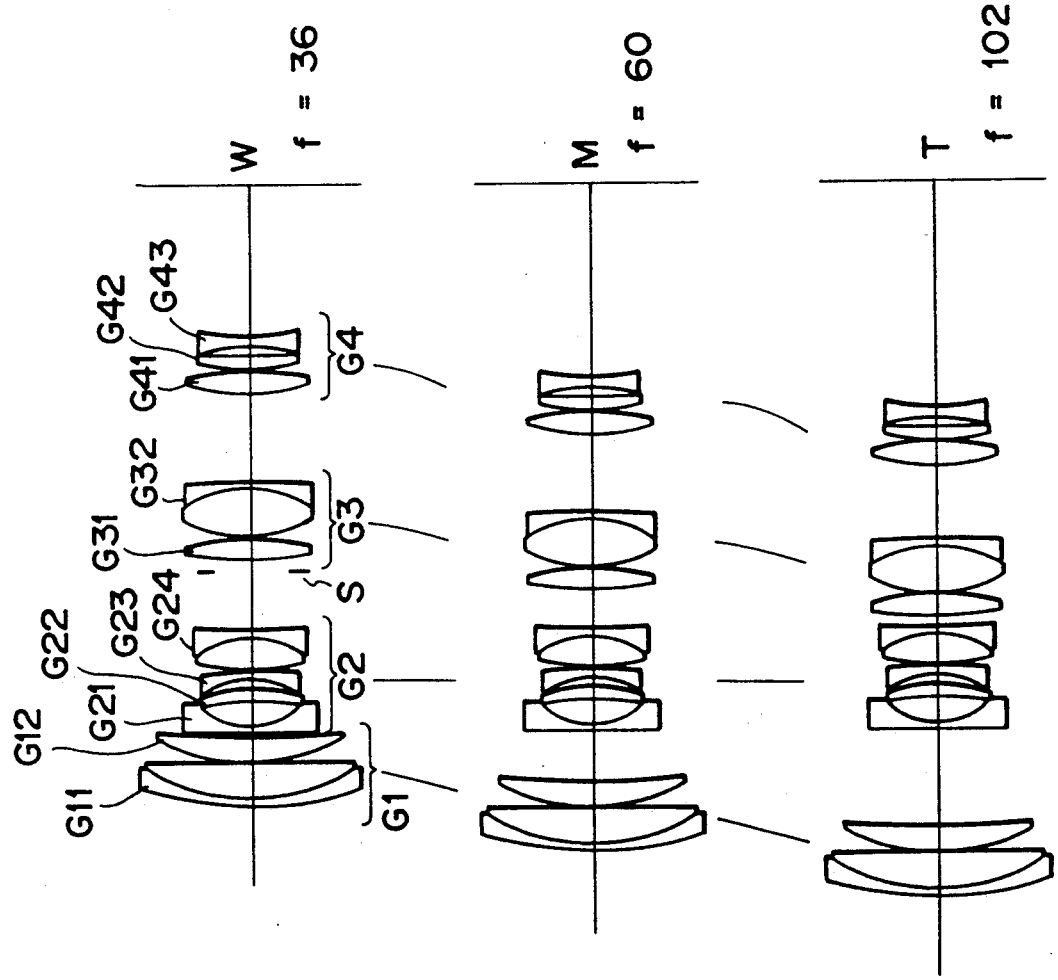
FIGS. 6A-6C are lens construction views showing the lens arrangement of a sixth embodiment of the present invention at the wide angle end (the shortest focal length state) and the displaced state of each lens unit in the medium focal length state and at the telephoto end (the longest focal length state), respectively.

That is, in the fourth, fifth and seventh embodiments, as shown in FIG. 4, during the magnification change from the wide angle end W to the telephoto end T, the first lens unit G1 is moved rectilinearly (linearly) toward the object side, the second lens unit G2 is moved non-rectilinearly (non-linearly) toward the image side, and the third lens unit G3 and the fourth lens unit G4 are moved non-rectilinearly (non-linearly) toward the object side. In the sixth embodiment, as shown in FIG. 6, during the magnification change from the wide angle end to the telephoto end, with the second lens unit G2 being fixed, the first lens unit G1 is moved rectilinearly (linearly) toward the object side, and the third lens unit G3 and the fourth lens unit G4 are moved non-rectilinearly (non-linearly) toward the object side.

Each embodiment will now be described in detail.

In the zoom lens of the fourth embodiment, as shown in FIG. 4, the positive first lens unit G1 is comprised of a negative meniscus lens having its convex surface facing the object side and a cemented positive lens G11 cemented thereto and having its surface of sharper curvature facing the object side, and a positive meniscus lens G12 having its convex surface facing the object side, and the negative second lens unit G2 is comprised of a negative lens (a first lens component) G21 having its concave surface of sharper curvature facing the image side and a positive meniscus lens (a second lens component) G22 having its convex surface facing the image side which together constitute a forward unit, a negative lens (a third lens component) G23 having its surface of sharper curvature facing the object side, and a compound positive lens (a fourth lens component) G24 forming a rearward unit comprising a biconvex positive lens and a negative meniscus lens separated therefrom and having its convex surface facing the image side and a positive combined refractive power. The positive third lens unit G3 comprises a biconvex positive lens G31, and a cemented positive lens G32 comprising a biconvex positive lens and a negative meniscus lens cemented thereto and having its convex surface facing the image side, and the positive fourth lens unit G4 is comprised of a biconvex positive single lens G41, a biconvex positive single lens G42 and a biconcave negative single lens G43.

The aspherical surface in the fourth embodiment is provided on that surface of the negative lens G21 positioned most adjacent to the object side of the second lens unit G2 which is adjacent to the object side, and is also provided on that surface of the negative lens G43 positioned most adjacent to the image side of the fourth lens unit G4 which is adjacent to the object side. An aperture stop S is disposed on the object side of the third lens unit G3.

Figures 5A, 5B, 5C:
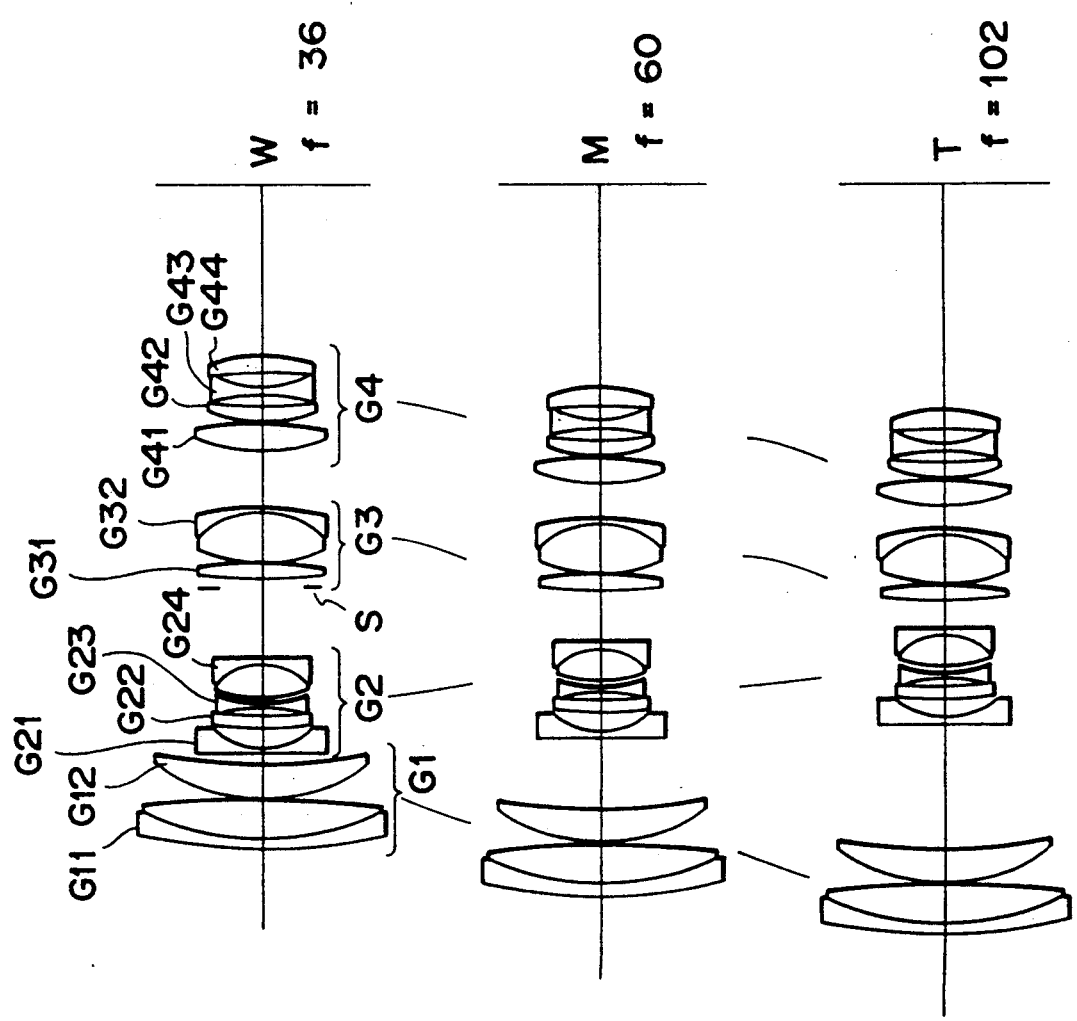
FIGS. 5A-5C are lens construction views showing the lens arrangement of a fifth embodiment of the present invention at the wide angle end (the shortest focal length state) and the displaced state of each lens unit in the medium focal length state and at the telephoto end (the longest focal length state), respectively.

The zoom lens of the fifth embodiment, as shown in FIG. 5, has a construction similar to that of the zoom lens of the fourth embodiment with respect to the first lens unit G1 and the third lens unit G3, but differs in the construction of the second lens unit G2 and the fourth lens unit G4 from the zoom lens of the fourth embodiment. That is, in the second lens unit G2, the second positive lens (second lens component) G22 from the object side in the second lens unit G2 is comprised of a positive meniscus lens having its convex surface facing the object side, and the positive lens (fourth lens component) G24 positioned most adjacent to the image side in the second lens unit G2 is constructed as a cemented lens comprising a biconvex positive lens and a negative lens cemented together. The fourth lens unit G4 is comprised of four single lenses, i.e., a biconvex positive lens G41, a positive meniscus lens G42 having its convex surface facing the object side, a biconcave negative lens G43 and a positive meniscus lens G44 having its convex surface facing the object side.

The aspherical surface in the fifth embodiment is provided on that surface of the second positive meniscus lens (second lens component) from the object side of the second lens unit G2 which is adjacent to the image side, and is also provided on that surface of the positive meniscus lens G44 positional most adjacent to the image side of the fourth lens unit G4 which is adjacent to the object side. The aperture stop S is disposed on the object side of the third lens unit G3.

The zoom lenses of the sixth and seventh embodiments, as shown in FIGS. 6 and 7, basically have a construction similar to that of the zoom lens of the fourth embodiment, but in both of these embodiments, the positive lens component (fourth lens component) G24 positioned most adjacent to the image side in the second lens unit G2 is constructed as a cemented lens comprising a biconvex positive lens and a negative lens cemented together, and the negative lens (third lens component) G23 in the second lens unit G2 is formed into a meniscus shape having its convex surface facing the image side.

The aspherical surface in the sixth and seventh embodiments is provided on that surface of the negative lens G21 positioned most adjacent to the object side of the second lens unit G2 which is adjacent to the object side, and is also provided on that surface of the negative lens G43 positioned most adjacent to the image side of the fourth lens unit G4 which is adjacent to the object side. The aperture stop S is disposed n the object side of the third lens unit G3.

Now, the numerical values and condition corresponding numerical values of the fourth to seventh embodiments will now be successively shown below.

In the tables below, the numbers at the left end represent the order from the object side, r represents the radius of curvature of each lens surface, d represents the spacing between adjacent lens surfaces, $\nu$ represents the Abbe number ($\nu d$), n represents the refractive index for d line ($\lambda = 587.6$ nm), f represents the focal length of the entire system, FN represents the F number, and $\phi$ represents the effective diameter of the aspherical lens. Also, the aspherical surface shown in the numerical values is expressed by $$X(h) = (h^2/r)/[1+(1-Kh^2/r^2)^{\frac{1}{2}}] + C2\, h^2 + C4\, h^4 + C6\, h^6 + C8\, h^8 + C10\, h^{10}$$

where X(h) is the distance, along the direction of the optical axis, of the vertex of each aspherical surface at a height y in the vertical direction from the optical axis, from the tangential plane, r is the reference paraxial radius of curvature, k is the cone coefficient, and Cn is the nth-order aspherical surface coefficient. Also, $E^{-n}$ at the left end in the nth-order aspherical surface coefficient Cn indicates $10^{-n}$.

TABLE 4

[Fourth Embodiment]

| | r | d | $\nu$ | n |
|---|---|---|---|---|
| 1 | 78.455 | 2.50 | 23.0 | 1.86074 |
| 2 | 50.684 | 10.40 | 64.1 | 1.51680 |
| 3 | 274.933 | 0.10 | | |
| 4 | 48.154 | 8.60 | 60.1 | 1.62041 |
| 5 | 236.584 | (variable) | | |
| 6 | −373.729 | 2.00 | 55.6 | 1.69680 |
| 7 | 18.407 | 6.50 | | |
| 8 | −60.903 | 3.00 | 32.2 | 1.67270 |
| 9 | −32.675 | 2.30 | | |
| 10 | −22.150 | 1.50 | 45.4 | 1.79668 |
| 11 | 218.114 | 0.10 | | |
| 12 | 63.247 | 6.00 | 27.8 | 1.69911 |
| 13 | −23.317 | 1.00 | | |
| 14 | −22.268 | 1.50 | 43.3 | 1.84042 |
| 15 | −62.995 | (variable) | | |
| 16 | 83.773 | 4.50 | 64.1 | 1.51680 |
| 17 | −78.375 | 0.20 | | |
| 18 | 40.598 | 11.00 | 58.9 | 1.51823 |
| 19 | −29.038 | 2.00 | 23.0 | 1.86074 |
| 20 | −106.992 | (variable) | | |
| 21 | 65.783 | 5.00 | 40.9 | 1.79631 |
| 22 | −79.123 | 0.10 | | |
| 23 | 65.913 | 4.00 | 58.9 | 1.51823 |
| 24 | −71.555 | 3.50 | | |
| 25 | −38.601 | 2.00 | 35.7 | 1.90265 |
| 26 | 90.587 | (Bf) | | |
| f | 35.9976 | 59.9994 | | 102.0004 |
| d5 | 3.1834 | 14.9955 | | 26.3132 |
| d15 | 17.2968 | 9.2013 | | 1.7712 |
| d20 | 19.5385 | 17.1105 | | 17.1911 |
| Bf | 39.4377 | 48.8877 | | 55.2087 |

6th surface (aspherical surface)
Reference paraxial radius of curvature: r = −373.729
Cone coefficient: k = 1
Aspherical surface coefficient
C2 = 0, C4 = 0.8906E$^{-8}$, C6 = −0.8437E$^{-8}$,
C8 = 0.4965E$^{-11}$, C10 = 0.1173E$^{-14}$
25th surface (aspherical surface)
Reference paraxial radius of curvature: r = −38.601
Cone coefficient: k = 1
Aspherical surface coefficient
C2 = 0, C4 = −0.4476E$^{-5}$, C6 = 0.3836E$^{-8}$,
C8 = −0.8606E$^{-11}$, C10 = 0.4804E$^{-13}$
$f_{G2} \cdot h_{G2R}/f_T = -2.30$
$f_{G3} \cdot h_{G3F}/f_T = 6.37$
$f_{G4} \cdot h_{G4F}/f_T = 12.93$
$f_{G1}/f_w = 2.22$
|AS-S|/fw = 0.01780 ... 6th surface ($\phi$ = 35.0)
$n_{G23} - n_{G22} = 0.124$

TABLE 5

[Fifth Embodiment]

| | r | d | $\nu$ | n |
|---|---|---|---|---|
| 1 | 155.449 | 2.50 | 23.0 | 1.86074 |
| 2 | 74.499 | 10.00 | 64.1 | 1.51680 |
| 3 | −259.546 | 0.10 | | |
| 4 | 46.543 | 8.50 | 60.7 | 1.56384 |
| 5 | 145.855 | (variable) | | |
| 6 | 325.539 | 2.00 | 55.6 | 1.69680 |
| 7 | 21.769 | 4.70 | | |
| 8 | 86.499 | 3.30 | 32.2 | 1.67270 |
| 9 | 159.011 | 1.80 | | |
| 10 | −55.728 | 1.80 | 43.3 | 1.84042 |
| 11 | 42.756 | 1.00 | | |
| 12 | 34.832 | 8.00 | 25.5 | 1.73038 |
| 13 | −17.010 | 1.80 | 35.7 | 1.90265 |
| 14 | 1289.022 | (variable) | | |
| 15 | 150.079 | 4.00 | 65.8 | 1.46450 |
| 16 | −121.431 | 0.20 | | |
| 17 | 45.180 | 12.00 | 58.9 | 1.51823 |
| 18 | −26.375 | 2.00 | 23.0 | 1.86074 |
| 19 | −62.148 | (variable) | | |
| 20 | 44.264 | 7.50 | 40.9 | 1.79631 |
| 21 | −82.574 | 0.10 | | |
| 22 | 35.948 | 3.80 | 60.7 | 1.56384 |

TABLE 5-continued

[Fifth Embodiment]

| | | | | |
|---|---|---|---|---|
| 23 | 94.333 | 3.30 | | |
| 24 | −53.118 | 2.00 | 33.9 | 1.80384 |
| 25 | 28.578 | 4.00 | | |
| 26 | −202.206 | 4.50 | 58.9 | 1.51823 |
| 27 | −42.134 | (Bf) | | |
| f | 35.9992 | 59.9998 | | 101.9999 |
| d5 | 2.3114 | 17.3500 | | 30.7561 |
| d14 | 19.3842 | 12.8622 | | 6.7919 |
| d19 | 14.2317 | 8.3758 | | 5.3811 |
| Bf | 42.9632 | 51.8707 | | 57.8420 |

9th surface (aspherical surface)
Reference paraxial radius of curvature: r = 159.011
Cone coefficient: k = 1
Aspherical surface coefficient
$C2 = 0$, $C4 = -0.4224E^{-5}$, $C6 = -0.3200E^{-8}$,
$C8 = -0.7919E^{-10}$, $C10 = -0.1090E^{-14}$ 26th surface (aspherical surface)
Reference paraxial radius of curvature: r = −202.206
Cone coefficient: k = 1
Aspherical surface coefficient
$C2 = 0$, $C4 = -0.6862E^{-5}$, $C6 = 0.1044E^{-7}$,
$C8 = -0.3762E^{-10}$, $C10 = 0.1420E^{-12}$
$f_{G2} \cdot h_{G2R}/f_T = -2.03$
$f_{G3} \cdot h_{G3F}/f_T = 8.44$
$f_{G4} \cdot h_{G4F}/f_T = 12.24$
$f_{G1}/f_w = 2.44$
$|AS\text{-}S|/f_w = 0.00254$ ... 9th surface ($\phi = 23.4$)
$n_{G23} - n_{G22} = 0.168$

TABLE 6

[Sixth Embodiment]

| | r | d | v | n |
|---|---|---|---|---|
| 1 | 97.026 | 2.50 | 23.0 | 1.86074 |
| 2 | 56.167 | 8.00 | 64.1 | 1.51680 |
| 3 | 856.519 | 0.10 | | |
| 4 | 47.298 | 6.80 | 60.6 | 1.60311 |
| 5 | 256.673 | (variable) | | |
| 6 | −493.392 | 2.00 | 55.6 | 1.69680 |
| 7 | 19.765 | 6.50 | | |
| 8 | −73.976 | 3.50 | 27.8 | 1.69911 |
| 9 | −32.755 | 2.00 | | |
| 10 | −22.259 | 1.80 | 45.4 | 1.79668 |
| 11 | −117.348 | 0.10 | | |
| 12 | 51.581 | 8.00 | 27.8 | 1.69911 |
| 13 | −25.391 | 1.80 | 43.3 | 1.84042 |
| 14 | 270.537 | (variable) | | |
| 15 | 96.752 | 5.80 | 65.8 | 1.46450 |
| 16 | −56.649 | 0.20 | | |
| 17 | 35.498 | 12.00 | 58.9 | 1.51823 |
| 18 | −31.779 | 2.00 | 23.0 | 1.86074 |
| 19 | −205.042 | (variable) | | |
| 20 | 46.604 | 6.50 | 40.9 | 1.79631 |
| 21 | −64.806 | 0.10 | | |
| 22 | 54.365 | 3.80 | 58.9 | 1.51823 |
| 23 | −458.484 | 2.60 | | |
| 24 | −39.139 | 2.00 | 35.7 | 1.90265 |
| 25 | 60.351 | (Bf) | | |
| f | 36.0279 | 59.9999 | | 102.0000 |
| d5 | .9353 | 12.7490 | | 24.5800 |
| d14 | 17.6849 | 9.5974 | | 2.3965 |
| d19 | 21.8480 | 18.9487 | | 17.9842 |
| Bf | 38.9564 | 49.9431 | | 58.1086 |

6th surface (aspherical surface)
Reference paraxial radius of curvature: r = −493.392
Cone coefficient: k = 1
Aspherical surface coefficient
$C2 = 0$, $C4 = 0.8786E^{-5}$, $C6 = -0.8848E^{-8}$,
$C8 = 0.1576E^{-10}$, $C10 = -0.5695E^{-14}$ 24th surface (aspherical surface)
Reference paraxial radius of curvature: r = −39.139
Cone coefficient: k = 1
Aspherical surface coefficient
$C2 = 0$, $C4 = -0.4387E^{-5}$, $C6 = 0.1674E^{-7}$,
$C8 = -0.6617E^{-10}$, $C10 = 0.1724E^{-12}$
$f_{G2} \cdot h_{G2R}/f_T = -2.58$

TABLE 6-continued

[Sixth Embodiment]

$f_{G3} \cdot h_{G3F}/f_T = 6.80$
$f_{G4} \cdot h_{G4F}/f_T = 13.96$
$f_{G1}/f_w = 2.22$
$|AS\text{-}S|/f_w = 0.01719$ ... 6th surface ($\phi = 24.3$)
$n_{G23} - n_{G22} = 0.0976$

TABLE 7

[Seventh Embodiment]

| | r | d | v | n |
|---|---|---|---|---|
| 1 | 83.330 | 2.50 | 23.0 | 1.86074 |
| 2 | 52.865 | 9.50 | 64.1 | 1.51680 |
| 3 | 330.123 | 0.10 | | |
| 4 | 48.840 | 8.30 | 60.1 | 1.62041 |
| 5 | 259.399 | (variable) | | |
| 6 | −391.079 | 2.00 | 55.6 | 1.69680 |
| 7 | 19.684 | 7.50 | | |
| 8 | −99.210 | 3.30 | 27.6 | 1.75520 |
| 9 | −40.125 | 2.30 | | |
| 10 | −23.108 | 1.80 | 45.4 | 1.79668 |
| 11 | −180.652 | 0.10 | | |
| 12 | 58.321 | 7.50 | 28.3 | 1.72825 |
| 13 | −23.773 | 1.80 | 43.3 | 1.84042 |
| 14 | 546.477 | (variable) | | |
| 15 | 107.760 | 5.00 | 64.1 | 1.51680 |
| 16 | −71.767 | 0.20 | | |
| 17 | 37.536 | 11.50 | 58.9 | 1.51823 |
| 18 | −28.551 | 2.00 | 23.0 | 1.86074 |
| 19 | −109.923 | (variable) | | |
| 20 | 69.668 | 6.30 | 40.9 | 1.79631 |
| 21 | −53.656 | 0.10 | | |
| 22 | 57.527 | 3.50 | 58.9 | 1.51823 |
| 23 | −216.487 | 2.80 | | |
| 24 | −40.485 | 2.00 | 35.7 | 1.90265 |
| 25 | −80.698 | (Bf) | | |
| f | 36.0265 | 60.0000 | | 101.9999 |
| d5 | 1.2462 | 13.7753 | | 25.4376 |
| d14 | 17.3928 | 9.6906 | | 2.4544 |
| d19 | 17.5468 | 14.8270 | | 14.9520 |
| Bf | 42.0195 | 51.3025 | | 57.5552 |

6th surface (aspherical surface)
Reference paraxial radius of curvature: r = −391.079
Cone coefficient: k = 1
Aspherical surface coefficient
$C2 = 0$, $C4 = 0.8906E^{-5}$, $C6 = -0.8111E^{-8}$,
$C8 = 0.6722E^{-11}$, $C10 = 0.9364E^{-14}$ 24th surface (aspherical surface)
Reference paraxial radius of curvature: r = −40.485
Cone coefficient: k = 1
Aspherical surface coefficient
$C2 = 0$, $C4 = -0.4402E^{-5}$, $C6 = 0.1305E^{-7}$,
$C8 = -0.8806E^{-10}$, $C10 = 0.2411E^{-12}$
$f_{G2} \cdot h_{G2R}/f_T = -2.36$
$f_{G3} \cdot h_{G3F}/f_T = 6.74$
$f_{G4} \cdot h_{G4F}/f_T = 13.40$
$f_{G1}/f_w = 2.22$
$|AS\text{-}S|/f_w = 0.01705$ ... 6th surface ($\phi = 34.0$)
$n_{G23} - n_{G22} = 0.0415$ As can be seen from the numerical values of each embodiment, there is achieved a high magnification zoom lens in which each lens unit is compactly constructed of a smallest possible number of lenses and yet F number is as bright as about 2.8 and moreover the zoom ratio amounts to even 2.83 and which covers a wide angle of view.

In each of the above-described embodiments, aberrations are corrected very well over the wide angle end to the telephoto end, and each embodiment has an excellent imaging performance.

It is desirable that the aperture stop S be set at a position more adjacent to the image side than the second lens unit to a position more adjacent to the object side than the fourth lens unit, and the aperture stop may be moved discretely from each unit for magnification change.

It can be understood that as described above, according to the present invention, there is achieved a great relative aperture zoom lens in which each lens unit is compactly constructed of a smallest possible number of lenses and yet F number is as bright as about 2.8 and moreover the zoom ratio amounts to even about three times and which has an excellent imaging performance over the wide angle end to the telephoto end.

What is claimed is:

1. A great relative aperture zoom lens including, in succession from the object side, a first lens unit having positive refractive power, a second lens unit having negative refractive power, a third lens unit having a positive refractive power, and a fourth lens unit having positive refractive power, said first lens unit, said third lens unit and said fourth lens unit being designed to be moved toward the object side and displaced relative to said second lens unit during magnification change from the wide angle end to the telephoto end, said second lens unit comprising a forward unit having negative refractive power and positioned on the object side, and a rearward unit having positive refractive power and positioned on the image side, and being designed to satisfy the following condition:

$$-3 \leq f_{G2} \cdot h_{G2R}/f_T \leq -1.76$$

where $f_{G2}$: the focal length of the second lens unit;

$h_{G2R}$: the height of the ray from the on-axis infinity object point from the position at which said ray has passed the outermost marginal edge of that surface of the second lens unit which is most adjacent to the image side at the telephoto end to the optical axis;

$f_T$: the focal length of the entire system at the telephoto end.

2. The great relative aperture zoom lens according to claim 1, wherein said fourth lens unit is further designed to satisfy the following condition:

$$10.3 \leq f_{G4} \cdot h_{G4F}/f_T \leq 25$$

where $f_T$: the focal length of the entire system at the telephoto end;

$f_{G4}$: the focal length of the fourth lens unit;

$h_{G4F}$: the height of the ray from the on-axis infinity object point from the position at which said ray has passed the outermost marginal edge of that surface of the fourth lens unit which is most adjacent to the object side at the telephoto end to the optical axis.

3. The great relative aperture zoom lens according to claim 1, wherein said third lens unit is further designed to satisfy the following condition:

$$4.9 \leq f_{G3} \cdot h_{G3F}/f_T \leq 11$$

where $f_{G3}$: the focal length of the third lens unit;

$h_{G3F}$: the height of the ray from the on-axis infinity object point from the position at which said ray has passed the outermost marginal edge of that surface of the third lens unit which is most adjacent to the object side at the telephoto end to the optical axis;

$f_T$: the focal length of the entire system at the telephoto end.

4. The great relative aperture zoom lens according to claim 1, wherein said first lens unit is designed to satisfy the following condition:

$$1.7 \leq f_{G1}/f_W \leq 3$$

where $f_W$ is the focal length of the entire system at the wide angle end, and $f_{G1}$ is the focal length of the first lens unit.

5. A great relative aperture zoom lens including, in succession from the object side, a first lens unit having positive refractive power, a second lens unit having negative refractive power, a third lens unit having positive refractive power, and a fourth lens unit having positive refractive power, said first lens unit, said third lens unit and said fourth lens unit being designed to be moved toward the object side and displaced relative to said second lens unit during magnification change from the wide angle end to the telephoto end, said second lens unit being comprised, in succession from the object side, of a forward unit comprising a first lens component having negative refractive power and a second lens component having negative refractive power, and a rearward unit comprising a third lens component having positive refractive power, said second lens unit and said fourth lens unit being further designed to satisfy the following conditions:

$$-3 \leq f_{G2} \cdot h_{G2R}/f_T \leq -2$$

$$10.3 \leq f_{G4} \cdot h_{G4F}/f_T \leq 25$$

where $f_{G2}$: the focal length of the second lens unit;

$h_{G2R}$: the height of the ray from the on-axis infinity object point from the position at which said ray has passed the outermost marginal edge of that surface of the second lens unit which is most adjacent to the image side at the telephoto end to the optical axis;

$f_T$: the focal length of the entire system at the telephoto end;

$f_{G4}$: the focal length of the fourth lens unit;

$h_{G4F}$: the height of the ray from the on-axis infinity object point from the position at which said ray has passed the outermost marginal edge of that surface of the fourth lens unit which is most adjacent to the object side at the telephoto end to the optical axis.

6. The great relative aperture zoom lens according to claim 5, wherein said third lens unit is further designed to satisfy the following condition:

$$5 \leq f_{G3} \cdot h_{G3F}/f_T \leq 9$$

where $f_{G3}$: the focal length of the third lens unit;

$h_{G3F}$: the height of the ray from the on-axis infinity object point from the position at which said ray has passed the outermost marginal edge of that surface of the third lens unit which is most adjacent to the object side at the telephoto end to the optical axis;

$f_T$: the focal length of the entire system at the telephoto end.

7. The great relative aperture zoom lens according to claim 5, wherein said first lens component and said second lens component which constitute said forward unit in said second lens unit are each comprised of a negative single lens or a cemented negative lens comprising positive and negative lenses cemented together, and said third lens component which constitutes said rearward unit is comprised of a positive lens and a negative lens cemented together or separated from each other.

8. The great relative aperture zoom lens according to claim 5, wherein said second lens unit has at least one lens surface thereof formed into an aspherical surface which satisfies the following condition:

$$0.0005 \leq |As - S|/f_W \leq 0.05$$

where $AS - S$ : the difference in the direction of the optical axis between the aspherical surface on the outermost marginal edge of the effective diameter and a reference spherical surface having a predetermined vertex radius of curvature;

$f_W$: the focal length of the entire system at the wide angle end.

9. The great relative aperture zoom lens according to claim 5, wherein said first lens unit comprises a cemented positive lens comprising a negative lens and a positive lens cemented thereto, and a positive lens provided on the image side proximately to said cemented positive lens, and is designed to satisfy the following condition:

$$1.7 \leq f_{G1}/f_W \leq 2.55$$

where $f_{G1}$: the focal length of the first lens unit;
$f_W$: the focal length of the entire system at the wide angle end.

10. The great relative aperture zoom lens according to claim 5, wherein said second lens unit is further designed to satisfy the following condition:

$$2.5 \leq f_{G2R}/|f_{G2}| \leq 5.5$$

$$0 < q_{G2R}/h_{G2R} \leq 0.15$$

$$(0.18/FN_T) \leq D/f_T \leq (0.35/FN_T)$$

$$0.09 \leq n_{2n} - n_{2P} \leq 0.22$$

where $f_{G2R}$: the focal length of the third lens component having positive refractive power in the second lens unit;

$f_{G2}$: the focal length of the second lens unit;

$q_{G2R}$: a value defined by $q_{G2R} = (r_B + r_A)/(r_B - r_A)$ when the radius of curvature of that surface of the third lens component having positive refractive power in the second lens unit which is most adjacent to the object side is $r_A$ and the radius of curvature of that surface which is most image side is $r_B$;

$FN_T$: the F number during the opening at the telephoto end,

D: the center thickness of a positive lens positioned on the object side of the third lens component having positive refractive power in the second lens unit;

$f_T$: the focal length of the entire system at the telephoto end, $n_{2n}$: the refractive index of a negative lens in the third lens component having positive refractive power in the second lens lens unit for d line (587.6 nm);

$n_{2p}$: the refractive index of said positive lens in the third lens component having positive refractive power in the second lens unit for d line (587.6 nm).

11. The great relative aperture zoom lens according to claim 10, which designed in accordance with data in the table below:

| | r | d | v | n |
|---|---|---|---|---|
| 1 | 142.768 | 2.50 | 23.0 | 1.86074 |
| 2 | 73.483 | 12.40 | 70.0 | 1.51860 |
| 3 | −280.849 | 0.10 | | |
| 4 | 45.375 | 9.00 | 60.7 | 1.56384 |
| 5 | 124.562 | (variable) | | |
| 6 | 418.949 | 2.00 | 52.3 | 1.74810 |
| 7 | 18.477 | 5.55 | | |
| 8 | −51.766 | 2.00 | 43.4 | 1.84042 |
| 9 | 76.133 | 0.35 | | |
| 10 | 33.856 | 9.00 | 25.5 | 1.73038 |
| 11 | −15.704 | 1.70 | 35.7 | 1.90265 |
| 12 | −443.341 | (variable) | | |
| 13 | 126.681 | 4.00 | 65.8 | 1.46450 |
| 14 | −97.873 | 0.20 | | |
| 15 | 46.279 | 11.00 | 58.9 | 1.51823 |
| 16 | −26.974 | 2.00 | 23.0 | 1.86074 |
| 17 | −70.750 | (variable) | | |
| 18 | 59.247 | 6.50 | 40.9 | 1.79631 |
| 19 | −76.390 | 0.15 | | |
| 20 | 30.786 | 3.90 | 56.0 | 1.56883 |
| 21 | 66.406 | 3.35 | | |
| 22 | −102.300 | 1.85 | 33.9 | 1.80384 |
| 23 | 29.128 | 4.30 | | |
| 24 | −124.935 | 3.60 | 58.9 | 1.51823 |
| 25 | −45.970 | (Bf) | | |
| f | 36.0000 | 59.9999 | | 102.0002 |
| d5 | 3.4087 | 18.5718 | | 31.7962 |
| d12 | 20.1182 | 13.6283 | | 7.5055 |
| d17 | 13.2124 | 7.0392 | | 3.8684 |
| Bf | 44.9643 | 53.7309 | | 59.9710 |

7th surface (aspherical surface)
Reference paraxial radius of curvature: r = 18.477
Cone coefficient: k = 1
Aspherical surface coefficient
$C2 = 0$, $C4 = -0.1729E^{-5}$, $C6 = -0.4735E^{-7}$,
$C8 = 0.3062E^{-9}$, $C10 = 0.2365E^{-11}$ 24th surface (aspherical surface)
Reference paraxial radius of curvature: r = −124.935
Cone coefficient: k = 1
Aspherical surface coefficient
$C2 = 0$, $C4 = -0.9195E^{-5}$, $C6 = -0.2412E^{-7}$
$C8 = 0.1272E^{-9}$, $C10 = -0.4185E^{-12}$ $f_{G2} \cdot h_{G2R}/f_T = -2.04$
$f_{G3} \cdot h_{G3F}/f_T = 7.64$
$f_{G4} \cdot h_{G4F}/f_T = 12.37$
$|AS-S|/f_W = 0.00275$ ... 7th surface ($\phi = 21.8$)
$f_{G1}/f_W = 2.44$
$f_{G2R}/|f_{G2}| = 4.25$
$q_{G2R}/h_{G2R} = 0.0714$
$D/f_T = 0.0882$ ... $FN_T = 2.9$
$n_{2n} - n_{2P} = 0.172$ where the numbers at the left end represent the order from the object side, r represents the radius of curvature of each lens surface, d represents the spacing between adjacent lens surface, v represents the Abbe number (vd), n represents the refractive index for d line ($\lambda = 587.6$ nm), f represents the focal length of the entire system, FN represents the F number, $\phi$ represents the effective diameter of the aspherical lens, $f_{G3}$ represents the focal length of the third lens unit, $h_{G3F}$ represents the height of the ray from the on-axis infinity object point from the position at which said ray has passed the outermost marginal edge of that surface of the third lens unit which is most adjacent to the object side at the telephoto end to the optical axis, $f_{G4}$ represents the focal length of the fourth lens unit, $h_{G4F}$ represents the height of the ray from the on-axis infinity object point from the position at which said ray has passed the outermost marginal edge of that surface of the fourth lens unit which is most adjacent to the object side at the telephoto end to the optical axis, AS−S represents the difference in the direction of the optical axis between the aspherical surface on the outermost marginal edge of the effective diameter and a reference spherical surface having a predetermined vertex radius of curvature, $f_W$ represents the focal length of the entire system at the wide angle end, $f_{G1}$ represents the focal length of the first lens unit, $f_{G2R}$ represents the focal length of the third lens component having positive refractive power in the second lens unit, $q_{G2R}$ represents a value defined by $q_{G2r}=(r_B+r_A)/(r_B-r_A)$ when the radius of curvature of that surface of the third lens component having positive refractive power in the second lens unit which is most adjacent to the object side is $r_A$ and the radius of curvature of that surface which is not adjacent to the image side is $r_B$, D represents the center thickness of said positive lens positioned on the object side of the third lens component having positive refractive power in the second lens unit, $f_T$ represents the focal length of the entire system at the telephoto end, $n_{2n}$ represents the refractive index of said negative lens in the third lens component having positive refractive power in the second lens unit for d line (587.6 nm), $n_{2p}$ represents the refractive index of said positive lens in the third lens component having positive refractive power in the second lens unit for d line (587.6 nm), the aspherical surface shown in the numerical values is expressed by $$X(h)=(h^2/r)/[1+(1-Kh^2/r^2)+C2^2+C4h^4+C6\ h^6+C8\ h^8+C10\ h^{10}$$

where X(h) is the distance, along the direction of the optical axis, of the vertex of each aspherical surface at a height y in the vertical direction from the optical axis, from the tangential plane, r is the reference peraxial radius of curvature, k is the cone coefficient, and Cn is the nth-order aspherical surface coefficient, and $E^{-n}$ at the left end in the nth-order aspherical surface coefficient Cn indicates $10^{-n}$.

12. The great relative aperture zoom lens according to claim 10, which is designed in accordance with data in the Table below:

| | r | d | v | n |
|---|---|---|---|---|
| 1 | 160.001 | 2.20 | 23.0 | 1.86074 |
| 2 | 77.254 | 11.50 | 70.0 | 1.51860 |
| 3 | −264.690 | 0.10 | | |
| 4 | 46.775 | 8.50 | 60.1 | 1.62041 |
| 5 | 121.025 | (variable) | | |
| 6 | 829.431 | 1.70 | 52.3 | 1.74810 |
| 7 | 22.000 | 0.03 | 55.9 | 1.49712 |
| 8 | 19.522 | 5.55 | | |
| 9 | −68.286 | 2.50 | 35.5 | 1.59507 |
| 10 | −31.061 | 1.70 | 45.4 | 1.79668 |
| 11 | 62.248 | 0.35 | | |
| 12 | 34.730 | 9.00 | 27.8 | 1.69911 |
| 13 | −14.755 | 1.70 | 39.8 | 1.86994 |
| 14 | −292.136 | (variable) | | |
| 15 | 94.290 | 4.30 | 65.8 | 1.46450 |
| 16 | −100.001 | 3.00 | | |
| 17 | 46.323 | 10.30 | 58.9 | 1.51823 |
| 18 | −27.173 | 2.00 | 23.0 | 1.86074 |
| 19 | −77.467 | (variable) | | |
| 20 | 57.255 | 6.00 | 40.9 | 1.79631 |

-continued

| | r | d | v | n |
|---|---|---|---|---|
| 21 | −75.244 | 0.15 | | |
| 22 | 30.552 | 3.90 | 56.0 | 1.56883 |
| 23 | 88.801 | 3.35 | | |
| 24 | −97.793 | 1.85 | 33.9 | 1.80384 |
| 25 | 28.388 | 4.80 | | |
| 26 | −80.750 | 0.05 | 55.9 | 1.49712 |
| 27 | −70.000 | 2.50 | 58.9 | 1.51823 |
| 28 | −50.329 | (Bf) | | |
| f | 35.9999 | 60.0000 | | 102.0008 |
| d5 | 4.0893 | 19.2524 | | 32.4768 |
| d14 | 18.1332 | 11.6433 | | 5.5205 |
| d19 | 15.9310 | 9.7578 | | 6.5870 |
| Bf | 43.1230 | 51.8897 | | 58.1296 |

8th surface (aspherical surface)
Reference paraxial radius of curvature: r = 19.522
Cone coefficient: k = 1
Aspherical surface coefficient
C2 = 0, C4 = −0.4461E$^{-5}$, C6 = −0.1156E$^{-6}$,
C8 = 0.6830E$^{-9}$, C10 = −0.4316E$^{-11}$
26th surface (aspherical surface)
Reference paraxial radius of curvature: r = −80.750
Cone coefficient: k = 1
Aspherical surface coefficient
C2 = 0, C4 = −0.9459E$^{-5}$, C6 = −0.3315E$^{-7}$,
C8 = 0.1960E$^{-9}$, C10 = −0.6054E$^{-12}$
$f_{G2} \cdot h_{G2R}/f_T = -2.08$
$f_{G3} \cdot h_{G3F}/f_T = 7.51$
$f_{G4} \cdot h_{G4F}/f_T = 12.47$
|AS-S|/fw = 0.01040 ... 8th surface (φ = 23.8)
$f_{G1}/f_W = 2.44$
$f_{G2R}/|f_{G2}| = 4.66$
$q_{G2R}/h_{G2R} = 0.0641$
$D/f_T = 0.0882$ ... $FN_T = 2.9$
$n_{2n}-n_{2P} = 0.171$ where the numbers at the left end represent the order from the object side, r represents the radius of curvature of each lens surface, d represents the spacing between adjacent lens surfaces, ν represents the Abbe number (νd), n represents the refractive index for d line (π=587.6 nm), f represents the focal length of the entire system, FN represents the F number, φ represents the effective diameter of the aspherical lens, $f_{G3}$ represents the focal length of the third lens unit, $h_{G3F}$ represents the height of the ray from the on-axis infinity object point from the position at which said ray has passed the outermost marginal edge of that surface of the third lens unit which is most adjacent to the object side at the telephoto end to the optical axis, $f_{G4}$ represents the focal length of the fourth lens unit, $h_{G4F}$ represents the height of the ray from the on-axis infinity object point from the position at which said ray has passed the outermost marginal edge of that surface of the fourth lens unit which is most adjacent to the object side at the telephoto end to the optical axis, AS−S represents the difference in the direction of the optical axis between the aspherical surface on the outermost marginal edge of the effective diameter and a reference spherical surface having a predetermined vertex radius of curvature, $f_{G1}$ represents the focal length of the first lens unit, $f_W$ represents the focal length of the entire system at the wide angle end, $f_{G2R}$ represents the focal length of the third lens component having positive refractive power in the second lens unit, $q_{G2R}$ represents a value defined by $q_{G2R}=(r_B+r_A)/(r_B-r_A)$ when the radius of curvature of that surface of the third lens component having positive refractive power in the second lens unit which is most adjacent to the object side is $r_A$ and the radius of curvature of that surface which is most adjacent to the image side is $r_B$, D represents the center thickness of said positive lens positioned on the object side of the third lens component having positive refractive power in the second lens unit, $f_T$ represents the focal length of the entire system at the telephoto end, $n_{2n}$ represents the refractive index of said negative lens in the third lens component having positive refractive power in the second lens unit for d line (587.6 nm), $n_{2p}$ represents the refractive index of said positive lens in the third lens component having positive refractive power in the second lens unit for d line (587.6 nm), the aspherical surface shown in the numerical values is expressed by $$X(h) = (h^2/r)/[1+(1-Kh^2/r^2)^{\frac{1}{2}}] + C2\ h^2 + C4\ h^4 + C6\ h^6 + C8\ h^8 + C10\ h^{10}$$

where X(h) is the distance, along the direction of the optical axis, of the vertex of each aspherical surface at a height y in the vertical direction from the optical axis, from the tangential plane, r is the reference paraxial radius of curvature, k is the cone coefficient, and Cn is the nth-order aspherical surface coefficient, and $E^{-n}$ at the left end in the nth-order aspherical surface coefficient Cn indicates $10^{-n}$.

13. The great relative aperture zoom lens according to claim 10, which is designed in accordance with data in the table below:

| | r | d | v | n |
|---|---|---|---|---|
| 1 | 146.457 | 2.50 | 23.0 | 1.86074 |
| 2 | 73.024 | 11.50 | 64.1 | 1.51680 |
| 3 | −189.533 | 0.10 | | |
| 4 | 44.101 | 8.50 | 60.1 | 1.62041 |
| 5 | 106.011 | (variable) | | |
| 6 | 103.749 | 1.50 | 49.5 | 1.77279 |
| 7 | 18.090 | 6.50 | | |
| 8 | −26.398 | 1.50 | 45.4 | 1.79668 |
| 9 | 125.417 | 0.20 | | |
| 10 | 48.765 | 9.00 | 27.8 | 1.69911 |
| 11 | −15.829 | 1.50 | 43.4 | 1.84042 |
| 12 | −69.654 | (variable) | | |
| 13 | 83.090 | 4.50 | 64.1 | 1.51680 |
| 14 | −73.258 | 0.20 | | |
| 15 | 38.601 | 11.00 | 58.9 | 1.51823 |
| 16 | −29.849 | 2.00 | 23.0 | 1.86074 |
| 17 | −138.715 | (variable) | | |
| 18 | 60.854 | 6.00 | 40.9 | 1.79631 |
| 19 | −91.396 | 0.10 | | |
| 20 | 72.680 | 5.00 | 58.9 | 1.51823 |
| 21 | −61.765 | 3.50 | | |
| 22 | −35.691 | 2.00 | 35.7 | 1.90265 |
| 23 | 105.287 | (variable) | | |
| f | 35.9965 | 59.9998 | | 101.9998 |
| d5 | 3.8115 | 15.8970 | | 26.6032 |
| d12 | 19.5387 | 11.6067 | | 4.0902 |
| d17 | 21.0986 | 18.2634 | | 16.2417 |
| Bf | 38.1196 | 47.7880 | | 56.3529 |

6th surface (aspherical surface)
Reference paraxial radius of curvature: r = 103.749
Cone coefficient: k = 1
Aspherical surface coefficient
C2 = 0, C4 = 0.1056E$^{-5}$, C6 = 0.1251E$^{-7}$,
C8 = −0.8668E$^{-10}$, C10 = 0.2457E$^{-12}$ 22nd surface (aspherical surface)
Reference paraxial radius of curvature: r = −35.691
Cone coefficient: k = 1
Aspherical surface coefficient
C2 = 0, C4 = −0.4476E$^{-5}$, C6 = 0.1070E$^{-7}$,
C8 = −0.4857E$^{-10}$, C10 = 0.1316E$^{-12}$ $f_{G2} \cdot h_{G2R}/f_T = -2.27$
$f_{G3} \cdot h_{G3F}/f_T = 6.64$
$f_{G4} \cdot h_{G4F}/f_T = 13.62$
|AS−S|/fw = 0.00197 . . . 6th surface ($\phi$ = 27.5)
$f_{G1}/f_W = 2.22$
$f_{G2R}/|f_{G2}| = 3.23$
$q_{G2R}/h_{G2R} = 0.0137$
$D/f_T = 0.0882$ . . . $FN_T = 2.9$ $n_{2n} - n_{2p} = 0.141$ where the numbers at the left end represent the order from the object side, r represents the radius of curvature of each lens surface, d represents the spacing between adjacent lens surfaces, $v$ represents the Abbe number (vd), n represents the refractive index for d line ($\lambda$ = 587.6 nm), f represents the focal length of the entire system, FN represents the F number, $\phi$ represents the effective diameter of the aspherical lens, $f_{G3}$ represents the focal length of the third lens unit, $h_{G3F}$ presents the height of the ray from the on-axis infinity object point from the position at which said ray has passed the outermost marginal edge of that surface of the third lens unit which is most adjacent to the object side at the telephoto end to the optical axis, $f_{G4}$ represents the focal length of the fourth lens unit, $h_{G4F}$ represents the height of the ray from the on-axis infinity object point from the position at which said ray has passed the outermost marginal edge of that surface of the fourth lens unit which is most adjacent to the object side at the telephoto end to the optical axis, AS−S represents the difference in the direction of the optical axis between the aspherical surface on the outermost marginal edge of the effective diameter and a reference spherical surface having a predetermined vertex radius of curvature, $f_W$ represents the focal length of the entire system at the wide angle end, $f_{G1}$ represents the focal length of the first lens unit, $f_{G2R}$ represents the focal length of the third lens component having positive refractive power in the second lens unit, $q_{G2R}$ represents a value defined by $q_{G2R} = (r_B + r_A)/(r_B - r_A)$ when the radius of curvature of that surface of the third lens component having positive refractive power in the second lens unit which is most adjacent to the object side is $r_A$ and the radius of curvature of that surface which is most adjacent to the image side is $r_B$, D represents the center thickness of said positive lens positioned on the object side of the third lens component having positive refractie power in the second lens unit, $f_T$ represents the focal length of the entire system at the telephoto end, $n_{2n}$ represent the refractive index of said negative lens in the third lens component having positive refractive power in the second lens unit for d line (587.6 nm), $n_{2p}$ represents the refractive index of said positive lens in the third lens component having positive refractive power in the second lens unit for d line (587.6 nm), the aspherical surface shown in the numerical values is expressed by $$X(h) = (h^2/r)/[1+(1-Kh^2/r^2)^{\frac{1}{2}}] + C2\ h^2 + C4\ h^4 + C6\ h^6 + C8\ h^8 + C10\ h^{10}$$

where X(h) is the distance, along the direction of the optical axis, of the vertex of each aspherical surface at a height y in the vertical direction from the optical axis, from the tangential plane, r is the reference paraxial radius of curvature, k is the cone coefficient, and Cn is the nth-order aspherical surface coefficient, and $E^{-n}$ at the left end in the nth-order aspherical surface coefficient Cn indicates $10^{-n}$.

14. The great relative aperture zoom lens according to claim 10, which is designed in accordance with data in the table below:

| r | d | v | n |
|---|---|---|---|

-continued

| | | | | |
|---|---|---|---|---|
| 1 | 78.455 | 2.50 | 23.0 | 1.86074 |
| 2 | 50.684 | 10.40 | 64.1 | 1.51680 |
| 3 | 274.933 | 0.10 | | |
| 4 | 48.154 | 8.60 | 60.1 | 1.62041 |
| 5 | 236.584 | (variable) | | |
| 6 | −373.729 | 2.00 | 55.6 | 1.69680 |
| 7 | 18.407 | 6.50 | | |
| 8 | −60.903 | 3.00 | 32.2 | 1.67270 |
| 9 | −32.675 | 2.30 | | |
| 10 | −22.150 | 1.50 | 45.4 | 1.79668 |
| 11 | 218.114 | 0.10 | | |
| 12 | 63.247 | 6.00 | 27.8 | 1.69911 |
| 13 | −23.317 | 1.00 | | |
| 14 | −22.268 | 1.50 | 43.3 | 1.84042 |
| 15 | −62.995 | (variable) | | |
| 16 | 83.773 | 4.50 | 64.1 | 1.51680 |
| 17 | −78.375 | 0.20 | | |
| 18 | 40.598 | 11.00 | 58.9 | 1.51823 |
| 19 | −29.038 | 2.00 | 23.0 | 1.86074 |
| 20 | −106.992 | (variable) | | |
| 21 | 65.783 | 5.00 | 40.9 | 1.79631 |
| 22 | −79.123 | 0.10 | | |
| 23 | 65.913 | 4.00 | 58.9 | 1.51823 |
| 24 | −71.555 | 3.50 | | |
| 25 | −38.601 | 2.00 | 35.7 | 1.90265 |
| 26 | 90.587 | (Bf) | | |
| f | 35.9976 | 59.9994 | | 102.0004 |
| d5 | 3.1834 | 14.9955 | | 26.3132 |
| d15 | 17.2968 | 9.2013 | | 1.7712 |
| d20 | 19.5385 | 17.1105 | | 17.1911 |
| Bf | 39.4377 | 48.8877 | | 55.2087 |

6th surface (aspherical surface)
Reference paraxial radius of curvature: r = −373.729
Cone coefficient: k = 1
Aspherical surface coefficient
$C2 = 0$, $C4 = 0.8906E^{-8}$, $C6 = -0.8437E^{-8}$,
$C8 = 0.4965E^{-11}$, $C10 = 0.1173E^{-14}$
25th surface (aspherical surface)
Reference paraxial radius of curvature: r = −38.601
Cone coefficient: k = 1
Aspherical surface coefficient
$C2 = 0$, $C4 = -0.4476E^{-5}$, $C6 = 0.3836E^{-8}$,
$C8 = -0.8606E^{-11}$, $C10 = 0.4804E^{-13}$
$f_{G2} \cdot h_{G2R}/f_T = -2.30$
$f_{G3} \cdot h_{G3F}/f_T = 6.37$
$f_{G4} \cdot h_{G4F}/f_T = 12.93$
$f_{G1}/f_W = 2.22$
$|AS-S|/f_W = 0.01780 \ldots$ 6th surface ($\phi = 35.0$)
$n_{G23} - n_{G22} = 0.124$ where the numbers at the left end represent the order from the object side, r represents the radius of curvature of each lens surface, d represents the spacing between adjacent lens surfaces, ν represents the Abbe number (νd), n represents the refractive index for d line (λ=587.6 nm), f represents the focal length of the entire system, FN represents the F number, φ represents the effective diameter of the aspherical lens, $f_{G3}$ represents the focal length of the third lens unit, $h_{G3F}$ represents the height of the ray from the on-axis infinity object point from the position at which said ray has passed the outermost marginal edge of that surface of the third lens unit which is most adjacent to the object side at the telephoto end to the optical axis, $f_{G4}$ represents the focal length of the fourth lens unit, $h_{G4F}$ represents the height of the ray from the on-axis infinity object point from the position at which said ray has passed the outermost marginal edge of that surface of the fourth lens unit which is most adjacent to the object side at the telephoto end to the optical axis, $f_{G1}$ represents the focal length of the first lens unit, $f_W$ represents the focal length of the entire system at the wide angle end, AS−S represents the difference in the direction of the optical axis between the aspherical surface on the outermost marginal edge of the effective diameter and a reference spherical surface having a predetermined vertex radius of curvature, $n_{G23}$ represents the refractive index of the negative third lens component in the second lens unit for d line (587.6 nm), $n_{G22}$ represents the refractive index of the negative second lens component in the second lens unit for d line (587.6 nm), the aspherical surface shown in the numerical values is expressed by $$X(h) = (h^2/r)/[1+(1-Kn^2/r^2)^{\frac{1}{2}}] + C2\ h^2 + C4\ h^4 + C6\ ^6 + C8\ h^8 + C10\ H^{10}$$

where X(h) is the distance, along the direction of the optical axis, of the vertex of each aspherical surface at a height y in the vertical direction from the optical axis, from the tangential plane, r is the reference paraxial radius of curvature, k is the cone coefficient, and Cn is the nth-order aspherical surface coefficient, and $E^{-n}$ at the left end in the nth-order aspherical surface coefficient Cn indicates $10^{-n}$.

15. The great relative aperture zoom lens according to claim 10, which is designed in accordance with data in the table below:

| | r | d | ν | n |
|---|---|---|---|---|
| 1 | 155.449 | 2.50 | 23.0 | 1.86074 |
| 2 | 74.499 | 10.00 | 64.1 | 1.51680 |
| 3 | −259.546 | 0.10 | | |
| 4 | 46.543 | 8.50 | 60.7 | 1.56384 |
| 5 | 145.855 | (variable) | | |
| 6 | 325.539 | 2.00 | 55.6 | 1.69680 |
| 7 | 21.769 | 4.70 | | |
| 8 | 86.499 | 3.30 | 32.2 | 1.67270 |
| 9 | 159.011 | 1.80 | | |
| 10 | −55.728 | 1.80 | 43.3 | 1.84042 |
| 11 | 42.756 | 1.00 | | |
| 12 | 34.832 | 8.00 | 25.5 | 1.73038 |
| 13 | −17.010 | 1.80 | 35.7 | 1.90265 |
| 14 | 1289.022 | (variable) | | |
| 15 | 150.079 | 4.00 | 65.8 | 1.46450 |
| 16 | −121.431 | 0.20 | | |
| 17 | 45.180 | 12.00 | 58.9 | 1.51823 |
| 18 | −26.375 | 2.00 | 23.0 | 1.86074 |
| 19 | −62.148 | (variable) | | |
| 20 | 44.264 | 7.50 | 40.9 | 1.79631 |
| 21 | −82.574 | 0.10 | | |
| 22 | 35.948 | 3.80 | 60.7 | 1.56384 |
| 23 | 94.333 | 3.30 | | |
| 24 | −53.118 | 2.00 | 33.9 | 1.80384 |
| 25 | 28.578 | 4.00 | | |
| 26 | −202.206 | 4.50 | 58.9 | 1.51823 |
| 27 | −42.134 | (Bf) | | |
| f | 35.9992 | 59.9998 | | 101.9999 |
| d5 | 2.3114 | 17.3500 | | 30.7561 |
| d14 | 19.3842 | 12.8622 | | 6.7919 |
| d19 | 14.2317 | 8.3758 | | 5.3811 |
| Bf | 42.9632 | 51.8707 | | 57.8420 |

9th surface (aspherical surface)
Reference paraxial radius of curvature: r = 159.011
Cone coefficient: k = 1
Aspherical surface coefficient
$C2 = 0$, $C4 = -0.4224E^{-5}$, $C6 = -0.3200E^{-8}$,
$C8 = -0.7919E^{-10}$, $C10 = -0.1090E^{-14}$
26th surface (aspherical surface)
Reference paraxial radius of curvature: r = −202.206
Cone coefficient: k = 1
Aspherical surface coefficient
$C2 = 0$, $C4 = -0.6862E^{-5}$, $C6 = 0.1044E^{-7}$,
$C8 = -0.3762E^{-10}$, $C10 = 0.1420E^{-12}$
$f_{G2} \cdot h_{G2R}/f_T = -2.03$
$f_{G3} \cdot h_{G3F}/f_T = 8.44$
$f_{G4} \cdot h_{G4F}/f_T = 12.24$
$f_{G1}/f_W = 2.44$
$|AS-S|/f_W = 0.00254 \ldots$ 9th surface ($\phi = 23.4$)

-continued $n_{G23} - n_{G22} = 0.168$ where the numbers at the left end represent the order from the object side, r represents the radius of curvature of each lens surface, d represents the spacing between adjacent lens surfaces, ν represents the Abbe number (νd), n represents the refractive index for d line (λ=587.6 nm), f represents the focal length of the entire system, FN represents the F number, φ represents the effective diameter of the aspherical lens, $f_{G3}$ represents the focal length of the third lens unit, $h_{G3F}$ represents the height of the ray from the on-axis infinity object point from the position at which said ray has passed the outermost marginal edge of that surface of the third lens unit which is most adjacent to the object side at the telephoto end to the optical axis, $f_{G4}$ represents the focal length of the fourth lens unit, $h_{G4F}$ represents the height of the ray from the on-axis infinity object point from the position at which said ray has passed the outermost marginal edge of that surface of the fourth lens unit which is most adjacent to the object side at the telephoto end to the optical axis, $f_{G1}$ represents the focal length of the first lens unit, $f_W$ represents the focal length of the entire system at the wide angle end, AS−S represents the difference in the direction of the optical axis between the aspherical surface on the outermost marginal edge of the effective diameter and a reference spherical surface having a predetermined vertex radius of curvature, $n_{G23}$ represents the refractive index of the negative third lens component in the second lens unit for d line (587.6 nm), $n_{G22}$ represents the refractive index of the negative second lens component in the second lens unit for d line (587.6 nm), the aspherical surface shown in the numerical values is expressed by $$X(h) = (h^2/r)/[1+(1-Kh^2/r^2)^{\frac{1}{2}}] + C2\ h^2 + C4\ h^4 + C6\ h^6 + C8\ h^8 + C10\ h^{10}$$

where X(h) is the distance, along the direction of the optical axis, of the vertex of each aspherical surface at a height y in the vertical direction from the optical axis, from the tangential plane, r is the reference paraxial radius of curvature, k is the cone coefficinet, and Cn is the nth-order aspherical surface coefficient, and $E^{-n}$ at the left end in the nth-order aspherical surface coefficient Cn indicates $10^{-n}$.

16. The great relative aperture zoom lens according to claim 10, which is designed in accordance with data in the table below:

|    | r | d | ν | n |
|----|---|---|---|---|
| 1  | 97.026 | 2.50 | 23.0 | 1.86074 |
| 2  | 56.167 | 8.00 | 64.1 | 1.51680 |
| 3  | 856.519 | 0.10 | | |
| 4  | 47.298 | 6.80 | 60.6 | 1.60311 |
| 5  | 256.673 | (variable) | | |
| 6  | −493.392 | 2.00 | 55.6 | 1.69680 |
| 7  | 19.765 | 6.50 | | |
| 8  | −73.976 | 3.50 | 27.8 | 1.69911 |
| 9  | −32.755 | 2.00 | | |
| 10 | −22.259 | 1.80 | 45.4 | 1.79668 |
| 11 | −117.348 | 0.10 | | |
| 12 | 51.581 | 8.00 | 27.8 | 1.69911 |
| 13 | −25.391 | 1.80 | 43.3 | 1.84042 |
| 14 | 270.537 | (variable) | | |
| 15 | 96.752 | 5.80 | 65.8 | 1.46450 |
| 16 | −56.649 | 0.20 | | |
| 17 | 35.498 | 12.00 | 58.9 | 1.51823 |
| 18 | −31.779 | 2.00 | 23.0 | 1.86074 |
| 19 | −205.042 | (variable) | | |
| 20 | 46.604 | 6.50 | 40.9 | 1.79631 |
| 21 | −64.806 | 0.10 | | |
| 22 | 54.365 | 3.80 | 58.9 | 1.51823 |
| 23 | −458.484 | 2.60 | | |
| 24 | −39.139 | 2.00 | 35.7 | 1.90265 |
| 25 | 60.351 | (Bf) | | |
| f  | 36.0279 | 59.9999 | | 102.0000 |
| d5 | .9353 | 12.7490 | | 24.5800 |
| d14 | 17.6849 | 9.5974 | | 2.3965 |
| d19 | 21.8480 | 18.9487 | | 17.9842 |
| Bf | 38.9564 | 49.9431 | | 58.1086 |

6th surface (aspherical surface)
Reference paraxial radius of curvature: r = −493.392
Cone coefficient: k = 1
Aspherical surface coefficient
$C2 = 0$, $C4 = 0.8786E^{-5}$, $C6 = -0.8848E^{-8}$,
$C8 = 0.1576E^{-10}$, $C10 = -0.5695E^{-14}$ 24th surface (aspherical surface)
Reference paraxial radius of curvature: r = −39.139
Cone coefficient: k = 1
Aspherical surface coefficient
$C2 = 0$, $C4 = -0.4387E^{-5}$, $C6 = 0.1674E^{-7}$,
$C8 = -0.6617E^{-10}$, $C10 = 0.1724E^{-12}$ $f_{G2} \cdot h_{G2R}/f_T = -2.58$
$f_{G3} \cdot h_{G3F}/f_T = 6.80$
$f_{G4} \cdot h_{G4F}/f_T = 13.96$
$f_{G1}/f_W = 2.22$
$|AS\text{-}S|/f_W = 0.01719 \ldots$ 6th surface (φ = 24.3)
$n_{G23} - n_{G22} = 0.0976$ where the numbers at the left end represent the order from the object side, r represents the radius of curvature of each lens surface, d represents the spacing betwewen adjacent lens surfaces, ν represents the Abbe number (νd), n represents the refractive index for d line (λ=587.6 nm), f represents the focal length of the entire system, FN represents the F number, φ represents the effective diameter of the aspherical lens, $f_{G3}$ represents the focal length of the third lens unit, $h_{G3F}$ represents the height of the ray from the on-axis infinity object point from the position at which said ray has passed the outermost marginal edge of that surface of the third lens unit which is most adjacent to the object side at the telephoto end to the optical axis, $f_{G4}$ represents the focal length of the fourth lens unit, $h_{G4F}$ represents the height of the ray from the on-axis infinity object point from the position at which said ray has passed the outermost marginal edge of that surface of the fourth lens unit which is most adjacent to the object side at the telephoto end to the optical axis, $f_{G1}$ represents the focal length of the first lens unit, $f_W$ represents the focal length of the entire system at the wide angle end, AS−S represents the difference in the direction of the optical axis betwween the aspherical surface on the outermost marginal edge of the effective diameter and a reference spherical surface having a predetermined vertex radius of curvature, $n_{G23}$ represents the refractive index of the negative third lens component in the second lens unit for d line (587.6 nm), $n_{G22}$ represents the refractive index of the negative second lens component in the second lens unit for d line (587.6 nm), the aspherical surface shown in the numerical values is expressed by $$X(h) = (h^2/r)/[1+(1-Kh^2/r^2)^{\frac{1}{2}}] + C2\ h^2 + C4\ h^4 + C6\ h^6 + C8\ h^8 + C10\ h^{10}$$

where X(h) is the distance, along the direction of the optical axis, of the vertex of each aspherical surface at a height y in the vertical direction from the optical axis, from the tangential plane, r is the reference paraxial radius of curvature. k is the cone cefficient, and Cn is the nth-order aspherical surface coefficient, and $E^{-n}$ at the left end in the nth-order aspherical surface coefficient Cn indicates $10^{-n}$.

17. The great relative aperture zoom lens according to claim 10, which is designed in accordance with data in the table below:

|    | r        | d         | v    | n       |
|----|----------|-----------|------|---------|
| 1  | 83.330   | 2.50      | 23.0 | 1.86074 |
| 2  | 52.865   | 9.50      | 64.1 | 1.51680 |
| 3  | 330.123  | 0.10      |      |         |
| 4  | 48.840   | 8.30      | 60.1 | 1.62041 |
| 5  | 259.399  | (variable)|      |         |
| 6  | −391.079 | 2.00      | 55.6 | 1.69680 |
| 7  | 19.684   | 7.50      |      |         |
| 8  | −99.210  | 3.30      | 27.6 | 1.75520 |
| 9  | −40.125  | 2.30      |      |         |
| 10 | −23.108  | 1.80      | 45.4 | 1.79668 |
| 11 | −180.652 | 0.10      |      |         |
| 12 | 58.321   | 7.50      | 28.3 | 1.72825 |
| 13 | −23.773  | 1.80      | 43.3 | 1.84042 |
| 14 | 546.477  | (variable)|      |         |
| 15 | 107.760  | 5.00      | 64.1 | 1.51680 |
| 16 | −71.767  | 0.20      |      |         |
| 17 | 37.536   | 11.50     | 58.9 | 1.51823 |
| 18 | −28.551  | 2.00      | 23.0 | 1.86074 |
| 19 | −109.923 | (variable)|      |         |
| 20 | 69.668   | 6.30      | 40.9 | 1.79631 |
| 21 | −53.656  | 0.10      |      |         |
| 22 | 57.527   | 3.50      | 58.9 | 1.51823 |
| 23 | −216.487 | 2.80      |      |         |
| 24 | −40.485  | 2.00      | 35.7 | 1.90265 |
| 25 | −80.698  | (Bf)      |      |         |
| f  | 36.0265  | 60.0000   |      | 101.9999|
| d5 | 1.2462   | 13.7753   |      | 25.4376 |
| d14| 17.3928  | 9.6906    |      | 2.4544  |
| d19| 17.5468  | 14.8270   |      | 14.9520 |
| Bf | 42.0195  | 51.3025   |      | 57.5552 |

6th surface (aspherical surface)
Reference paraxial radius of curvature: r = −391.079
Cone coefficient: k = 1
Aspherical surface coefficient
$C2 = 0, C4 = 0.8906E^{-5}, C6 = -0.8111E^{-8}$,
$C8 = 0.6722E^{-11}, C10 = 0.9364E^{-14}$ 24th surface (aspherical surface)
Reference paraxial radius of curvature: r = −40.485
Cone coefficient: k = 1
Aspherical surface coefficient
$C2 = 0, C4 = -0.4402E^{-5}, C6 = 0.1305E^{-7}$,
$C8 = -0.8806E^{-10}, C10 = 0.2411E^{-12}$
$f_{G2} \cdot h_{G2R}/f_T = -2.36$
$f_{G3} \cdot h_{G3F}/f_T = 6.74$
$f_{G4} \cdot h_{G4F}/f_T = 13.40$
$f_{G1}/f_w = 2.22$
$|AS-S|/fw = 0.01705 ...$ 6th surface ($\phi = 34.0$)
$n_{G23} - n_{G22} = 0.0415$ where the numbers at the left end represent the order from the object side, r represents the radius of curvature of each lens surface, d represents the spacing between adjacent lens surface, $v$ represents the Abbe numbers ($vd$), n represents the refractive index for d line ($\lambda = 587.6$ nm), f represents the focal length of the entire system, FN represents the F number, $\phi$ represents the effective diameter of the aspherical lens, $f_{G3}$ represents the focal length of the third lens unit, $h_{G3F}$ represents the height of the ray from the on-axis infinity object point from the position at which said ray has passed the outermost marginal edge of that surface of the third lens unit which is most adjacent to the object side at the telephoto end to the optical axis, $f_{G4}$ represents the focal length of the fourth lens unit, $h_{G4F}$ represents the height of the ray from the on-axis infinity object point from the position at which said ray has passed the outermost marginal edge of that surface of the fourth lens unit which is most adjacent to the object side of the telephoto end to the optical axis, $f_{G1}$ represents the focal length of the first lens unit, $f_W$ represents the focal length of the entire system at the video angle, AS−S represents the difference in the direction of the optical axis between the aspherical surface on the outermost marginal edge of the effective diameter and a reference spherical surface having a predetermined vertex radius of curvature, $n_{G23}$ represents the refractive index of the negative third lens component in the second lens unit for d line (587.6 nm), $n_{G22}$ represents the refractive index of the negative second lens component in the second lens unit for d line (587.6 nm), the aspherical surface shown in the numerical values is expressed by $$X(h) = (h^2/r)/[1 + (1-Kh^2/r^2)] + C2\ h^2 + C2\ h^4 + C6\ h^6 + C8\ h^8 + C10\ h^{10}$$

where K(h) is the distance, along the direction of the optical axis, of the vertex of each aspherical surface at a height y in the vertical direction from the optical axis, from the tangential plane, r is the reference paraxial radius of curvature, k is the cone coefficient, and Cn is the nth-order aspherical surface coefficient, and $E^{-n}$ at the left end in the nth-order aspherical surface coefficient Cn indicates $10^{-n}$.

18. A great relative aperture zoom lens including, in succession from the object side, a first lens unit having positive refractive power, a second lens unit having negative refractive power, a third lens unit having positive refractive power, and a fourth lens unit having positive refractive power, said first lens unit, said third lens unit and said fourth lens unit being designed to be moved toward the object side and displaced relative to said second lens unit during magnification change from the wide angle end to the telephoto end, said second lens unit being comprised, in succession from the object side, of a forward unit comprising a first lens component having negative refractive power and a second lens component having negative refractive power, and a rearward unit comprising a third lens component having positive refractive power, said second lens unit and said fourth lens unit being designed to satisfy the following conditions:

$$-2.5 \leq f_{G2} \cdot h_{G2R}/f_T \leq -2$$

$$10.3 \leq f_{G4} \cdot h_{G4F}/f_T \leq 20$$

where
$f_{G2}$: the focal length of the second lens unit;
$h_{G2R}$: the height of the ray from the on-axis infinity object point from the position at which said ray has passed the outermost marginal edge of that surface of the second lens unit which is most adjacent to the image side at the telephoto end to the optical axis;
$f_{G4}$: the focal length of the four lens unit;
$h_{G4F}$: the height of the ray from the on-axis infinity object point from the position at which said ray has passed the outermost marginal edge of that surface of the fourth lens unit which is most adjacent to the object side at the telephoto end to the optical axis;
$f_T$: the focal length of the entire system at the telephoto end.

19. The great relative aperture zoom lens according to claim 18, wherein said third lens unit is further designed to satisfy the following condition:

$$5.7 \leq f_{G3} \cdot h_{G3F}/f_T \leq 8.5$$

where $f_{G3}$: the focal length of the third lens unit;

$h_{G3F}$: the height of the ray from the on-axis infinity object point from the position at which said ray has passed the outermost marginal edge of that surface of the third lens unit which is most adjacent to the object side at the telephoto end to the optical axis;

$f_T$: the focal length of the entire system at the telephoto end.

20. The great relative aperture zoom lens according to claim 18, wherein said second lens unit is further designed to satisfy the following conditions $$3.15 \leq f_{G2R}/|f_{G2}| \leq 5.5$$

$$0 < q_{G2R}/h_{G2R} \leq 0.15$$

$$(0.18/F_{NT}) \leq D/f_T \leq (0.35/F_{NS})$$

$$0.135 \leq n_{2n} - n_{2P} \leq 0.2$$

where $f_{G2R}$: the focal length of the third lens component having positive refractive power in the second lens unit;

$f_{G2}$: the focal length of the second lens unit;

$q_{G2R}$: a value defined by $q_{G2R} = (r_B + r_A)/(r_B - r_A)$ when the radius of curvature of that surface of the third lens component having positive refractive power in the second lens unit which is most adjacent to the object side is $r_A$ and the radius of curvature of that surface which is most adjacent to the image side is $r_B$;

$F_{NT}$: the F number during the opening at the telephoto end;

D: the center thickness of a positive lens positioned on the object side of the third lens component having positive refractive power in the second lens unit;

$f_T$: the focal length of the entire system at the telephoto end;

$n_{2n}$: the refractive index of a negative lens in the third lens component having positive refractive power in the second lens unit for d line (587.6 nm);

$n_{2p}$: the refractive index of said positive lens in the third lens component having positive refractive power in the second lens unit for d line (587.6 nm).

21. A great relative aperture zoom lens including, in succession from the object side, a first lens unit having positive refractive power, a second lens unit having negative refractive power, a third lens unit having positive refractive power, and a fourth lens unit having positive refractive power, said first lens unit, said third lens unit and said fourth lens unit being designed to be moved toward the object side and displaced relative to said second lens unit during magnification change from the wide angle end to the telephoto end, said second lens unit having, in succession from the object side, a forward unit comprising a first lens component having negative refractive power, a second lens component having having positive refractive power and a third lens component having negative refractive power, and a rearward unit comprising a fourth lens component having positive refractive power, and being designed to satisfy the following condition:

$$-3 \leq f_{G2} \cdot h_{G2R}/f_T \leq -1.76$$

where $f_{G2}$: the focal length of the second lens unit;

$h_{G2R}$: the height of the ray from the on-axis infinity object point from the position at which said ray has passed the outermost marginal edge of that surface of the second lens unit which is most adjacent to the image side at the telephoto end to the optical axis;

$f_T$: the focal length of the entire system at the telephoto end.

22. The great relative aperture zoom lens according to claim 21, wherein said first lens component, said second lens component and said third lens component which constitute said forward unit in said second lens unit are each comprised of a single lens, and said fourth lens component which constitutes said rearward unit is comprised of a positive lens and a negative lens cemented together or separated from each other.

23. The great relative aperture zoom lens according to claim 21, wherein when the focal length of said first lens unit is $f_{G1}$ and the focal length of the entire system at the wide angle end is $f_W$, said first lens unit is further designed to satisfy the following condition:

$$2 \leq f_{G1}/f_W \leq 3$$

24. The great relative aperture zoom lens according to claim 21, wherein when the focal length of said third lens unit is $f_{G3}$ and the focal length of the entire system at the telephoto end is $f_T$ and the height of the ray from the on-axis infinity object point from the position at which said ray has passed the outermost marginal edge of that surface of the third lens unit which is most adjacent to the object side at the telephoto end to the optical axis is $h_{G3F}$, said third lens unit is further designed to satisfy the following condition:

$$4.9 \leq f_{G3} \cdot h_{G3F}/f_T \leq 11$$

25. The great relative aperture zoom lens according to claim 21, wherein when the focal length of said fourth lens unit is $f_{G4}$ and the focal length of the entire system at the telephoto end is $f_T$ and the height of the ray from the on-axis infinity object point from the position at which said ray has passed the outermost marginal edge of that surface of the fourth lens unit which is most adjacent to the object side at the telephoto end to the optical axis is $h_{G4F}$, said fourth lens unit is further designed to satisfy the following condition:

$$10.4 \leq f_{G4} \cdot h_{G4F}/f_T \leq 16.5$$

26. The great relative aperture zoom lens according to claim 21, wherein said second lens unit has at least one lens surface thereof formed into an aspherical surface which satisfies the following condition:

$$0.0005 \leq |AS - S|/f_W \leq 0.05$$

where $AS - S$: the difference in the direction of the optical axis between the aspherical surface on the outermost marginal edge of the effective diameter and a reference spherical surface having a predetermined vertex radius of curvature;

$f_W$: the focal length of the entire system at the wide angle end.

27. The great relative aperture zoom lens according to claim 21, wherein said second lens component and said third lens component which constitute part of said forward unit in said second lens unit are designed to satisfy the following condition:

$$0 < n_{G23} - n_{G22} < 0.4$$

where $n_{G23}$: the refractive index of the negative third lens component in the second lens unit for d line (587.6 nm);

$n_{G22}$: the refractive index of the negative second lens component in the second lens unit for d line (587.6 nm).

* * * * *